US012731944B2

(12) United States Patent
Wang et al.

(10) Patent No.: US 12,731,944 B2
(45) Date of Patent: Sep. 8, 2026

(54) FLOATING CONNECTION CONDUCTOR, FLOATING ELECTRIC CONNECTOR AND VEHICLE-MOUNTED ELECTRONIC DEVICE

(71) Applicant: SHANGHAI•AEROSPACE•SCIENCE & INDUSTRY•APPLIANCE•CO., LTD., Shanghai (CN)

(72) Inventors: Xu Wang, Shanghai (CN); Jian Wang, Shanghai (CN); Jun Wang, Shanghai (CN); Zimin Zhang, Shanghai (CN)

(73) Assignee: SHANGHAI•AEROSPACE•SCIENCE & INDUSTRY•APPLIANCE•CO., LTD., Shanghai (CN)

( * ) Notice: Subject to any disclaimer, the term of this patent is extended or adjusted under 35 U.S.C. 154(b) by 677 days.

(21) Appl. No.: 18/249,452

(22) PCT Filed: Oct. 22, 2021

(86) PCT No.: PCT/CN2021/125664
§ 371 (c)(1),
(2) Date: Apr. 18, 2023

(87) PCT Pub. No.: WO2023/273030
PCT Pub. Date: Jan. 5, 2023

(65) Prior Publication Data
US 2023/0387630 A1 Nov. 30, 2023

(30) Foreign Application Priority Data
Jun. 30, 2021 (CN) ......................... 202110741013.4

(51) Int. Cl.
*H01R 13/631* (2006.01)
*H01R 12/71* (2011.01)
(Continued)

(52) U.S. Cl.
CPC ....... *H01R 13/6315* (2013.01); *H01R 12/716* (2013.01); *H01R 12/91* (2013.01); *H01R 13/02* (2013.01); *H01R 2201/26* (2013.01)

(58) Field of Classification Search
CPC .... H01R 13/6315; H01R 13/05; H01R 13/08; H01R 13/2421; H01R 12/91
(Continued)

(56) References Cited

U.S. PATENT DOCUMENTS 5,201,663 A * 4/1993 Kikuchi ............. H01R 13/6315 439/82
5,306,169 A * 4/1994 Fukushima .......... H01R 12/737 439/248
(Continued)

FOREIGN PATENT DOCUMENTS

CN 102403602 A 4/2012
CN 103151633 A 6/2013
(Continued)

OTHER PUBLICATIONS

Notice of Reason for Refusal (with English translation) received in corresponding Application No. JP 2023-524665, dated Apr. 8, 2024, 10 pages.
(Continued)

*Primary Examiner* — Marcus E Harcum
(74) *Attorney, Agent, or Firm* — Dority & Manning, PA

(57) ABSTRACT

The present application relates to a floating connection conductor, a floating electric connector and a vehicle-mounted electronic device. The floating connection conductor comprises a welding part, a base-fixed part, a suspended floating part, a floating-fixed part and a contact part, wherein the base-fixed part is fixed to a base body; the floating-fixed part is fixed to a floating body, and the contact part is in conduction with and abuts against a plug connector; and the
(Continued)

suspended floating part is located between the base-fixed part and the floating-fixed part and is bent to form a suspended section.

18 Claims, 19 Drawing Sheets

(51) Int. Cl.
*H01R 12/91* (2011.01)
*H01R 13/02* (2006.01)

(58) Field of Classification Search
USPC .................................................. 439/247, 248
See application file for complete search history.

(56) References Cited

U.S. PATENT DOCUMENTS

| | | | | |
|---|---|---|---|---|
| 6,039,590 | A * | 3/2000 | Kunishi | H01R 13/6315 439/247 |
| 7,635,274 | B2 * | 12/2009 | Fukazawa | H01R 12/716 439/74 |
| 8,721,356 | B2 * | 5/2014 | Webb | H01R 13/58 439/248 |
| 8,845,349 | B2 * | 9/2014 | Shindo | H01R 13/6315 439/247 |
| 9,583,869 | B2 * | 2/2017 | Shindo | H01R 31/06 |
| 9,627,822 | B2 * | 4/2017 | Hori | H01R 12/91 |
| 9,711,880 | B2 * | 7/2017 | Kiryu | H01R 13/6315 |
| 9,917,403 | B2 * | 3/2018 | Doi | H01R 12/91 |
| 10,199,761 | B1 * | 2/2019 | Kuo | H01R 12/716 |
| 10,522,929 | B2 * | 12/2019 | Shimba | H01R 13/502 |
| 10,553,980 | B2 * | 2/2020 | Ogura | H01R 13/113 |
| 10,608,361 | B2 * | 3/2020 | Teruki | H01R 13/506 |
| 10,971,839 | B1 * | 4/2021 | Kuo | H01R 12/724 |
| 11,296,447 | B2 * | 4/2022 | Horii | H01R 12/716 |
| 11,682,860 | B2 * | 6/2023 | Shioda | H01R 13/6315 439/247 |
| 12,136,787 | B2 * | 11/2024 | Ikegami | H01R 12/91 |
| 12,300,930 | B2 * | 5/2025 | Ikegami | H01R 13/41 |
| 2006/0089018 | A1 * | 4/2006 | Orita | H01R 12/58 439/74 |
| 2013/0084751 | A1 | 4/2013 | Shindo et al. | |
| 2016/0111804 | A1 * | 4/2016 | Saito | H01R 13/42 439/733.1 |
| 2017/0170588 | A1 * | 6/2017 | Doi | H01R 12/91 |
| 2019/0148884 | A1 * | 5/2019 | Sugiki | H01R 12/91 439/247 |
| 2022/0173536 | A1 * | 6/2022 | Kitagawa | H01R 12/91 |
| 2023/0327355 | A1 * | 10/2023 | Takahira | H01R 12/73 439/247 |

FOREIGN PATENT DOCUMENTS

| | | | | | |
|---|---|---|---|---|---|
| CN | 107026335 | A | | 8/2017 | |
| CN | 208444982 | U | | 1/2019 | |
| CN | 112421273 | A | | 2/2021 | |
| CN | 112864740 | A | | 5/2021 | |
| CN | 113488789 | A | | 10/2021 | |
| CN | 114447648 | A | * | 5/2022 | H01R 13/10 |
| GB | 2188497 | A | * | 9/1987 | H01R 13/02 |
| JP | 2002246119 | A | * | 8/2002 | |
| JP | 2009146817 | A | | 7/2009 | |
| JP | 2009230943 | A | | 10/2009 | |
| JP | 2013093318 | A | | 5/2013 | |
| JP | 2017212025 | A | | 11/2017 | |
| JP | 2020174034 | A | * | 10/2020 | |
| JP | 2021030870 | A | | 3/2021 | |
| KR | 1020200008814 | A | | 1/2020 | |
| WO | WO2021045090 | A1 | | 3/2021 | |

OTHER PUBLICATIONS

Extended European Search Report for corresponding Application No. 21947957.3, dated Jul. 17, 2024, 84 pages.
Japanese Office Action (w/ English translation) for corresponding Application No. 2023-524665, dated Aug. 20, 2024, 8 pages.
Chinese Office Action for corresponding Application No. 202111262976.2, dated Mar. 30, 2023, 7 pages.
Office Action received in Application No. CN 202110741013.4, dated Mar. 16, 2022, 8 pages.
International Search Report and Written Opinion (with English translation) for PCT/CN2021/125664, mailed on Jan. 28, 2022, 10 pages.

* cited by examiner

FLOATING CONNECTION CONDUCTOR, FLOATING ELECTRIC CONNECTOR AND VEHICLE-MOUNTED ELECTRONIC DEVICE

CROSS REFERENCE TO RELATED APPLICATION

The present application is the U.S. National Stage entry of International Application No. PCT/CN2021/125664, filed on Oct. 22, 2021, which, in turn, is based on and claims priority to Chinese Patent Application with No. 202110741013.4, filed on Jun. 30, 2021, the contents of which are expressly incorporated herein by reference in their entirety.

TECHNICAL FIELD

The present disclosure relates to the field of floating board-to-board connection, and particularly to a floating connection conductor, a floating electrical connector and a vehicle-mounted electronic device.

BACKGROUND

A board-to-board connector is a miniature coupling plug and socket that can directly connect power supplies and signals between printed circuit boards through the pins of the connector. With the rapid development of electronic products, board-to-board connectors are widely used in consumer, industrial control, automobile, medical, communication and many other fields. With the development of miniaturization and integration of electronic equipment in these fields, more and more functional modules are integrated into a limited space. The application environment of these modules is becoming more and more complex, often including a high temperature, a complex vibration environment, a large processing error environment, etc. When different circuit boards implement the power supply or signals intercommunication, the complex application environment often allows the conductor of the connector to suffer from more strength and stress than the connector material itself can withstand, which may cause the transient interruption of the electrical signal of the connector or performance degradation or destruction of the material itself of the connector. In the field of floating board-to-board connection, in addition to the complex and changeable application scenarios and multi-module integration, the development trend of the electronic products also shows the phenomenon that the signals used are developing to 10 Gbps or even higher frequencies, which requires a higher transmission speed for the connector in the connection scenario using the board-to-board connector, that is, the transmission speed of the connector in the connection scenario of the board-to-board connector has also become one of the important factors for the system to realize its functions.

The conventional board-to-board connector does not have the stable electrical connection capability when the center of the plug interface of the plug connector and the socket connector are offset more than ±0.2 mm. Therefore, if the conventional board-to-board connector is employed to work in the high-vibration environment, or when the contact region is used in a low-temperature environment below minus 20° C. or a high-temperature environment above 85° C., it will cause a data transmission failure and even damage to the connector, etc. In application scenarios such as traveling of an automobile at a high speed on a bumpy road, rapid CT scanning, and interconnection of ultrasonic probes between multi-layer boards, etc., it is very easy for the electrical connection in the contact region to be disconnected instantaneously, accordingly there is a safety risk and it is easy to cause accidents.

Therefore, it is necessary to continue to improve the floating connection used between the plug connector and the socket connector to implement the stable electrical connection.

SUMMARY

According to various embodiments of the present disclosure, it is necessary to provide a floating connection conductor, a floating electrical connector and a vehicle-mounted electronic device.

A floating connection conductor includes a weld portion, a base fixing portion, a suspended floating portion, a floating fixing portion and a contact portion sequentially connected;

- the weld portion is configured to be welded to a circuit board;
- the base fixing portion is configured to be fixed to a base body;
- the floating fixing portion is configured to be fixed to a floating body;
- the contact portion is configured to be connected to and abut against a plug connector; and
- the suspended floating portion is located between the base fixing portion and the floating fixing portion and is configured to bend to form a suspended segment, a space occupied by the suspended segment being limited by a preset width.

With the above-mentioned floating connection conductor, in an aspect, the base body is fixed through the base fixing portion, and the weld portion is welded to the circuit board, which is conducive to stably connecting the base body to the circuit board. In another aspect, the contact portion abuts against the plug connector and the conduction is implemented, which is conducive to stably connecting the plug connector to the floating connection conductor. In a further aspect, due to the design of the suspended segment, the floating connection of the plug connector to the base body and the circuit board through the suspended floating portion is implemented, which is beneficial to withstand the mechanical load in the complex application environment of a high-frequency vibration environment and a high-acceleration mechanical shock, so it can be used for connectors in the low-speed signal, high current, and extra-large floating tolerance application scenarios. Since the suspended segment occupies a limited space, a plurality of floating connection conductors is adapted to use side by side, thereby implementing effective vibration damping in the vibrating environments. Due to the deformation capability of the suspended floating portion and the suspended segment thereof, when the floating connection conductor is applied to the board-to-board connection, the effective connection and signal conduction between the conductor structure and the plug conductor can be effectively guaranteed. In a further aspect, the structure of the floating connection conductor is simple, thus the floating connection conductor is adapted to operate in a certain low temperature environment and high temperature environment.

In an embodiment, the weld portion incudes a connection region and a weld region which connected to the connection region, the connection region and the weld region are bent, and the connection region is connected to the base fixing portion; and/or the floating fixing portion and the suspended floating portion are bent; and/or the base fixing portion is configured to be fixed to the base body through an insertion type connection or interference fit; and/or the contact portion is configured to be inserted into the plug connector in a pluggable manner, and be connected to and abut against the plug connector; and/or the floating fixing portion and the contact portion are formed in one piece, or the weld portion, the base fixing portion, the suspended floating portion, the floating fixing portion, and the contact portion are formed in one piece.

In an embodiment, the connection region and the weld region are bent to form a first bending line, the floating fixing portion and the suspended floating portion are bent to form a second bending line, and an included angle in a range of 75° to 105° is formed between the second bending line and the first bending line.

In an embodiment, the floating connection conductor is provided with a first bending opening at a position in a bending region between the connection region and the weld region and adjacent to the suspended floating portion; and/or the floating connection conductor is provided with a second bending opening at a position in a bending region between the floating fixing portion and the suspended floating portion and adjacent to the contact portion.

In an embodiment, the space occupied by the suspended segment is limited by the width of the contact portion; and/or a space occupied by the bending region of the suspended segment formed by bending the suspended floating portion is limited by the width of the contact portion.

In an embodiment, a space occupied by the floating segment and the suspended segment of the suspended floating portion is limited by the width of the contact portion, and is limited by a total length of the contact portion and the floating fixing portion.

In an embodiment, the suspended floating portion includes at least one arc segment and at least one straight segment; and the at least one arc segment is bent to form the at least one suspended segment; and/or the at least one straight segment is bent to form the at least one suspended segment; and/or the at least one arc segment and the at least one straight segment are bent together to form the at least one suspended segment.

In an embodiment, an included angle of 0° to 150° is formed between the arc segment and the straight segment.

In an embodiment, the suspended floating portion includes at least two straight segments, and an included angle of 0° to 90° is formed between two adjacent straight segments.

In an embodiment, there exists at least one suspended segment;

the suspended floating portion includes a first connection segment, a floating segment and a second connection segment sequentially connected;

the first connection segment is connected to the base fixing portion, the second connection segment is connected to the floating fixing portion;

the suspended floating portion is bent to form the suspended segment, and/or the floating segment and the first connection segment are bent together to form the suspended segment, and/or the floating segment and the second connection segment are bent together to form the suspended segment.

In an embodiment, the floating connection conductor is formed by stamping and blanking and bending at least once.

In an embodiment, a line along which the suspended segment is bent is perpendicular, parallel or inclined to an extension direction of the contact portion.

In an embodiment, the suspended floating portion is bent sideward, bent transversely, or bent toward positive and negative sides to form the at least one suspended segment.

In an embodiment, the floating connection conductor is entirely within a rectangular or a circular shape before being bent to form the suspended segment, an area occupied by the suspended floating portion is greater than 23% of a total area of the floating connection conductor.

In an embodiment, a floating electrical connector includes a plug connector and a socket connector, the socket connector is provided with the floating connection conductor according to any one of the above-mentioned embodiments, and the socket connector includes the base body and the floating body.

In an embodiment, the socket connector is provided with a floating connection conductor group consisting of at least three floating connection conductors arranged regularly; and the base fixing portion of each floating connection conductor in the floating connection conductor group is fixed to the base body, the floating fixing portion is fixed to the floating body, and the contact portion is connected to and abuts against the plug connector.

In an embodiment, the plug connector is provided with a protruding guide post, the floating body is provided with a concave portion, or the base body and the floating body jointly form the concave portion, and a shape of the protruding guide post matches a shape of the concave portion, and is configured to guide the protruding guide post to insert into the concave portion from a preset orientation.

In an embodiment, the floating body is provided with a guide convex portion adjacent to the concave portion, the plug connector is provided with a guide groove corresponding to the guide convex portion.

In an embodiment, the base body is provided with a heat dissipation groove, and the weld portion passes through the heat dissipation groove and is exposed outside the base body.

In an embodiment, a vehicle-mounted electronic device includes the floating electrical connector according to any one of the above-mentioned embodiments.

BRIEF DESCRIPTION OF THE DRAWINGS

In order to illustrate the technical solution of the embodiments of the present disclosure or the conventional technology more clearly, the accompanying drawings used in the description of the embodiments or the conventional technology will be briefly introduced. Obviously, the accompanying drawings in the following description are merely some embodiments of the present disclosure, and those skilled in the art can also obtain other drawings based on these drawings without creative work.

DETAILED DESCRIPTION

Figure 1:
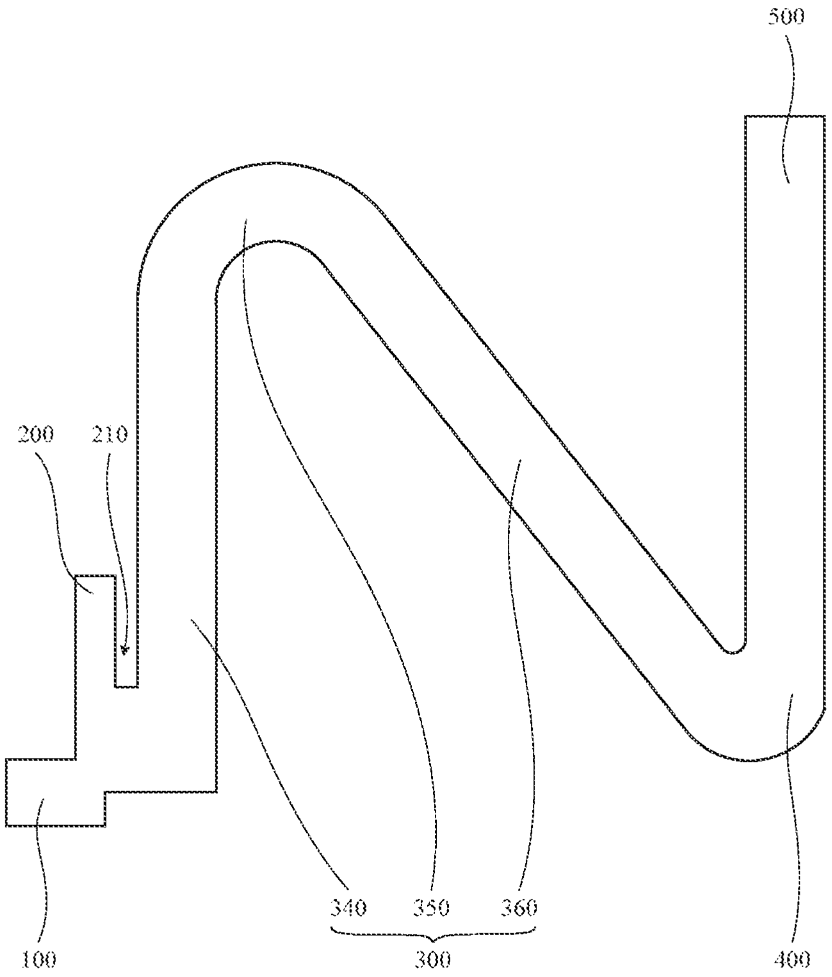
FIG. 1 is a schematic structure diagram of a floating connection conductor before being bent according to an embodiment of the present disclosure.

In order to make the above-mentioned purpose, features and advantages of the present disclosure more obvious and understandable, specific embodiments of the present disclosure will be detailed below with reference to the accompanying drawings. In the following description, the specific details are set forth in order to provide a thorough understanding of the present disclosure. However, the present disclosure can be implemented in many other manners different from those described here, and those skilled in the art can make similar improvements without departing from the concept of the present disclosure, so that the present disclosure is not limited to the specific embodiments disclosed below.

It should be noted that when a component is referred to as being "fixed on" or "provided on" another component, it may be directly on the other component or there may also be an intermediate component. When a component is referred to as being "connected" to another component, it may be directly connected to the other component or there may be an intermediate component at the same time. The terms "vertical", "horizontal", "upper", "lower", "left", "right" and other similar expressions used in the description of the present disclosure are only for the purpose of illustration and do not represent the unique implementation mode.

In addition, the terms "first" and "second" are merely used for descriptive purposes, and cannot be interpreted as indicating or implying relative importance or implicitly specifying the quantity of indicated technical features. Thus, the features defined as "first" and "second" may explicitly or implicitly include at least one of these features. In the description of the present disclosure, "plurality" means at least two, such as two, three, etc., unless otherwise specifically defined.

In the present disclosure, unless otherwise clearly specified and limited, a first feature is "on" or "under" a second feature, which means that the first feature is directly in contact with the second feature, or that the first feature and the second feature are indirectly contact through an intermediary. Moreover, the first feature is "on", "above" or "on top of" the second feature, it may mean that the first feature is directly above or obliquely above the second feature, or it just means that the first feature is higher in level than the second feature. The first feature is "below", "beneath" or "under" the second feature, it may mean that the first feature is directly below or obliquely below the second feature, or it just means that the first feature is lower in level than the second feature. Unless otherwise defined, all technical and scientific terms used in the description of the present disclosure have the same meaning as commonly understood by those skilled in the art of the present disclosure. The terms used in the description of the present disclosure are merely for the purpose of describing specific embodiments, and are not intended to limit the present disclosure. The term "and/or" used in the description of the present disclosure includes any and all combinations of one or more related listed items.

In an embodiment of the present disclosure, a floating connection conductor includes a weld portion, a base fixing portion, a suspended floating portion, a floating fixing portion and a contact portion which are sequentially connected. The weld portion is configured to be welded to a circuit board. The base fixing portion is configured to be fixed to a base body. The floating fixing portion is configured to be fixed to the floating body. The contact portion is configured to be connected to and abut against the plug connector. The suspended floating portion is located between the base fixing portion and the floating fixing portion and is configured to bend to form a suspended segment. A space occupied by the suspended segment is limited by a preset width. With the above-mentioned floating connection conductor, in an aspect, the base body is fixed through the base fixing portion, and the weld portion is welded to the circuit board, which is conducive to stably connecting the base body to the circuit board. In another aspect, the contact portion abuts against the plug connector and the conduction is implemented, which is conducive to stably connecting the plug connector to the floating connection conductor. In a further aspect, due to the design of the suspended segment, the floating connection of the plug connector to the base body and the circuit board through the suspended floating portion is implemented, which is beneficial to withstand the mechanical load in the complex application environment of a high-frequency vibration environment and a high-acceleration mechanical shock, so it can be used for connectors in the low-speed signal, high current, and extra-large floating tolerance application scenarios. Since the suspended segment occupies a limited space, a plurality of floating connection conductors is adapted to use side by side, thereby implementing effective vibration damping in the vibrating environments. Due to the deformation capability of the suspended floating portion and the suspended segment thereof, when the floating connection conductor is applied to the board-to-board connection, the effective connection and signal conduction between the conductor structure and the plug conductor can be effectively guaranteed. In a further aspect, the structure is simple, thus the floating connection conductor is adapted to operate in a certain low temperature environment and high temperature environment.

In an embodiment, a floating connection conductor includes part or all of the structures in the following embodiments, that is, the floating connection conductor includes some or all of the following technical features. In an embodiment, a floating connection conductor includes a weld portion, a base fixing portion, a suspended floating portion, a floating fixing portion and a contact portion which are sequentially connected. In an embodiment, the weld portion and the base fixing portion are formed in one piece; and/or the floating fixing portion and the contact portion are formed in one piece; or the weld portion, and the base fixing portion, the suspended floating portion, the floating fixing portion and the contact portion are formed in one piece. In an embodiment, the floating connection conductor is molded by stamping and blanking, that is, the weld portion, the base fixing portion, the suspended floating portion, the floating fixing portion and the contact portion are formed in one piece by stamping and blanking. Such design enables the floating connection conductor to withstand the mechanical load in the complex application environment of the high-frequency vibration environment and the high-acceleration mechanical shock, and is particularly adapted to the connectors in the low-speed signal, high current, and extra-large floating tolerance application scenarios.

In order to make full use of materials to avoid waste, in an embodiment, the floating connection conductor is entirely within a rectangular or a circular shape before being bent to form the suspended segment. Further, in an embodiment, the floating connection conductor is entirely within a square shape before being bent to form the suspended segment, that is, an area occupied by each floating connection conductor is covered by a square shape. Such design is conducive to making full use of the material, so that a large number of floating connection conductors can be arranged regularly, and then molded by stamping and blanking, which not only avoids waste of the material, but also improves the production efficiency.

In order to improve the anti-vibration performance, further, in an embodiment, the area occupied by the suspended floating portion is greater than 23% of a total area of the floating connection conductor. In an embodiment, the area occupied by the suspended floating portion is greater than 30% of the total area of the floating connection conductor. In an embodiment, the area occupied by the suspended floating portion is greater than 40% of the total area of the floating connection conductor. In an embodiment, the area occupied by the suspended floating portion is greater than 50% of the total area of the floating connection conductor. Further, in an embodiment, the area occupied by the suspended floating portion is adjusted by the number of bending shapes; and in a region with the same area, the more the bending shapes, the larger the area occupied by the suspended floating portion. This is a design for matching the stamping and blanking molding. It can be appreciated that the larger the suspended floating portion is, the larger the suspended segment is, which is conducive to improving the vibration energy attenuation effect, thereby improving the anti-vibration performance and ensuring sufficient vibration damping effect in the vibration environment. In an embodiment, the floating connection conductor is molded by stamping and blanking and manufactured by bending at least once. In an embodiment, the suspended floating portion is bent to form the suspended segment. In an embodiment, the floating connection conductor is molded by stamping and blanking and manufactured by bending two or more times. Such design simplifies the production process of the floating connection conductor, greatly improves the production efficiency of the floating connection conductor, and also ensures the vibration damping effect.

In order to facilitate the installation and fixing of the floating connection conductor, in an embodiment, the weld portion is configured to be welded to a circuit board. In an embodiment, the weld portion includes a connection region and a weld region which are connected. The connection region and the weld region are bent, and the connection region is connected to the base fixing portion. Further, in an embodiment, the connection region is perpendicular to the weld region, and the weld region is parallel to the circuit board, that is, a bending line between the connection region and the weld region, i.e., a first bending line, is parallel to the circuit board. Further, in an embodiment, a bending region is formed at a bending position between the connection region and the weld region, that is, a first bending region. Such design is beneficial to stably connect the floating connection conductor to the circuit board.

In order to facilitate the installation and fixing of the base body of the socket connector, in an embodiment, the base fixing portion is configured to be fixed to the base body. In an embodiment, the base fixing portion is configured to be fixed to the base body through an insertion type connection or interference fit, so that the base body can be fixed to the circuit board through the floating connection conductor. Further, in an embodiment, the base fixing portion is perpendicular to the weld region. Such design is beneficial to relatively fix the base body of the socket connector onto the circuit board.

In order to facilitate the floating connection, the connection of the plug connector and the conduction, in an embodiment, the floating fixing portion is configured to be fixed to a floating body. The contact portion is configured to be connected to and abut against the plug connector. In an embodiment, the contact portion is configured to be inserted into the plug connector in a pluggable manner, and be connected to and abut against the plug connector. Furthermore, in an embodiment, the base fixing portion and/or the floating fixing portion are provided with shape variation portions to enhance the stability of the fixing. In an embodiment, the shape variation portion has a concave-convex structure, a threaded structure or a stepped structure to improve the stability and fixing of the installation. Through such design, the contact portion abuts against the plug connector and implements the conduction, which is conducive to stably connecting the plug connector to the floating connection conductor, and the fixing of the floating body completely depends on the floating fixing portion, so that the abutting and connection between the plug connector and the contact portion are implemented under the restriction of the floating body.

In order to attenuate the vibration energy, in an embodiment, the suspended floating portion is located between the base fixing portion and the floating fixing portion and is configured to bend to form the suspended segment, and the space occupied by suspended segment is limited by the preset width. In an embodiment, the suspended floating portion is bent to form the suspended segment. Further, in an embodiment, the suspended segment is in a floating state, that is, the suspended segment is not in contact with other components, especially a hard contact. In an embodiment, the preset width is in a range of 0.5 mm to 3.5 mm. Further, in an embodiment, the preset width is determined according to a design specification of the socket connector or a floating connection conductor group, or the preset width is set and adjusted according to the signal transmission requirement of the floating connection. Such design by means of the suspended segment implements the floating connection of the plug connector to the base body and the circuit board through the suspended floating portion, accordingly the design has an effective vibration damping effect in the vibration environment. Moreover, due to the deformation capabilities of the suspended floating portion and the suspended segment thereof, the floating connection conductor can effectively ensure the effective connection and signal conduction between the conductor structure and the plug conductor when applied to the board-to-board connection. In a specific application, usually a plurality of floating connection conductors jointly forms a floating connection conductor group. If the space occupied by the floating segment is too large, it will directly affect a volume of the floating connection conductor group, and it is easy to cause the contact between the adjacent floating connection conductors to causes signal errors, which may result in traffic accidents or production accidents in severe cases, and result in the property damage and even affect the life safety. However, each embodiment of the present disclosure skillfully limits the space occupied by the suspended segment by the preset width to ensure limited floating state and vibration interval of the suspended floating portion, especially the suspended segment, without interfering other suspended floating portions or suspended segments thereof, which effectively guarantees the accurate and high-speed transmission of a large amount of data; and due to the simple structure, such floating connection conductor is adapted to operate in a certain low temperature environment and high temperature environment.

In order to enhance the vibration damping effect, in an embodiment, the floating fixing portion and the suspended floating portion are bent. In an embodiment, an included angle in a range of 75 degrees to 105 degrees is formed between the floating fixing portion and the weld region. Further, in an embodiment, the floating fixing portion is perpendicular to the weld region. In such design, at least three bending regions are formed, that is, there exists at least three direction-changing conduction regions. The vibration force at the position where the floating body is in contact with the plug connector undergoes at least three changes of direction and at least one attenuation by the suspended segment to the position where the base body is in contact with the circuit board; and the suspended segment in the floating state is beneficial to implement the cushioning and shock absorption in the high-vibration environment, thereby avoiding the hard conduction of the vibrations. Further, the floating connection conductor is a conductor as a whole, so that it is beneficial to adapt to a certain vibration environment in a certain low temperature environment and high temperature environment, ensure the accuracy of signal transmission, and avoid the problem of packet loss in a large amount of data transmission, which is especially adapted to the high-speed signal transmission. In each embodiment, the vibration frequency in the vibration environment is not higher than 2000 Hz, and the acceleration is not higher than 150 $m/s^2$. The temperature in the low temperature environment is not lower than −55° C. The temperature in the high temperature environment is not higher than +125° C. That is, the high and low temperature environment is the application environment with a temperature range of −55° C. to +125° C., and the operating environment of the floating connection conductor can cover a wide temperature range of −55° C. to +125° C. A trial product can implement a floating of ±1.0 mm or even ±1.5 mm in the actual measurement, and can transmit multiple channels of 3A DC current. Therefore, within a space with the designed limited size, the floating connection conductor according to the embodiment of the present disclosure can implement the capability of an extra-large floating tolerance.

In order to fit the shape limitation of the contact portion or the floating fixing portion, in an embodiment, the space occupied by the suspended segment is limited by the width of the contact portion. In the embodiment, the width of the contact portion serves as the preset width. Further, in an embodiment, the floating fixing portion and the suspended floating portion are bent and have bending angles. The space occupied by the suspended segment is limited by the width of the contact portion and the bending angle. In an embodiment, the floating fixing portion and the suspended floating portion are bent and the floating fixing portion is perpendicular to the weld region, and the space occupied by the suspended segment is limited by the width of the contact portion. Further, in an embodiment, the space occupied by the suspended segment is limited by the maximum width of the contact portion and the floating fixing portion. That is, a larger one of the maximum width of the contact portion and the maximum width of the floating fixing portion serves as the widest value of the space occupied by the suspended segment, to prevent the suspended segment from being in contact with other floating connection conductors in the operating state such as during the vibration. In an embodiment, a space occupied by the bending region of the suspended segment formed by bending the suspended floating portion is also limited by the width of the contact portion. Alternatively, the space occupied by the floating segment and the suspended segment of the suspended floating portion is limited by the width of the contact portion, and is also limited by a total length of the contact portion and the floating fixing portion. In an embodiment, the space occupied by the bending region of the suspended segment formed by bending the suspended floating portion is also limited by the maximum width of the contact portion and the floating fixing portion. Alternatively, the space occupied by the floating segment and the suspended segment of the suspended floating portion is limited by the maximum width of the contact portion and the floating fixing portion, and is also limited by a total length of the contact portion and the floating fixing portion. Such design cleverly uses the contact portion and the floating fixing portion to jointly limit the space occupied by the suspended segment, a vibration space is reasonably formed, thereby avoiding mutual interference among a plurality of floating connection conductors, which is conducive to ensuring the high-speed transmission of a large amount of data, such that the floating connection conductors are adapted to the vibration environments, especially the low-speed vibration environments.

In an embodiment, the connection region and the weld region are bent to form a first bending line. The floating fixing portion and the suspended floating portion are bent to form a second bending line. An included angle in a range of 75 degrees to 105 degrees is formed between the second bending line and the first bending line. In order to facilitate the control of the bending direction and avoid unnecessary extrusions and protrusions, in an embodiment, the floating connection conductor is provided with a first bending opening at a bending position between the connection region and the weld region and adjacent to the suspended floating portion; and/or the floating connection conductor is provided with a second bending opening at a bending position between the floating fixing portion and the suspended floating portion and adjacent to the contact portion. In an embodiment, the weld portion includes the connection region and the weld region connected to the connection region. The connection region and the weld region are bent. The connection region is connected to the base fixing portion. The floating fixing portion and the suspended floating portion are bent. The base fixing portion is configured to be fixed to the base body of the socket connector through an insertion type connection or interference fit. The contact portion is configured to be inserted into the plug connector in a pluggable manner, and be connected to and abut against the plug connector. The floating fixing portion and the contact portion are formed in one piece. Alternatively, the weld portion, the base fixing portion, the suspended floating portion, the floating fixing portion, and the contact portion are formed in one piece. The connection region and the weld region are bent to form the first bending line. The floating fixing portion and the suspended floating portion are bent to form the second bending line. An included angle in a range of 75° to 105° is formed between the second bending line and the first bending line. The floating connection conductor is provided with a first bending opening at a position in the bending region between the connection region and the weld region and adjacent to the suspended floating portion; the floating connection conductor is provided with the second bending opening at a position in the bending region between the floating fixing portion and the suspended floating portion and adjacent to the contact portion. The rest of the embodiments can be deduced in the same way, and the details will not be repeated.

In an embodiment, as shown in FIG. 1, the floating connection conductor includes a weld portion 100, a base fixing portion 200, a suspended floating portion 300, a floating fixing portion 400 and a contact portion 500 which are sequentially connected. Further, in the embodiment, the floating connection conductor is provided with a spacing 210 between the base fixing portion 200 and the suspended floating portion 300, to facilitate the fixing of the base body through the base fixing portion 200.

In an embodiment, the floating connection conductor or the suspended floating portion thereof is formed by stamping and blanking processes and the bending process. Specifically, a blanking region formed by a combination of an arc line and a straight line is formed by stamping and blanking. Among the multiple adjacent straight-line segments in the blanking region, at least one included angle between the adjacent straight segments is in a range of 0° to 90°, including 0° and 90°. After the blanking, the blanking region is formed by bending at least once, and a terminal of the blanking region is bent into a spring-like structure to implement the vibration damping. The bending can be performed on the same side, or in both directions. That is, the floating connection conductor is implemented by blanking and bending, and the bending direction includes but is not limited to simultaneous up, simultaneous down, up and down, and various blanking and bending modes for terminals of other shapes.

In an embodiment, the suspended floating portion includes at least one arc segment and at least one straight segment. The at least one arc segment is bent to form the at least one suspended segment; and/or the at least one straight segment is bent to form the at least one suspended segment; and/or the at least one arc segment and the at least one straight segment are bent together to form the at least one suspended segment. An included angle of 0° to 150° is formed between the arc segment and the straight segment; or the suspended floating portion includes at least two straight segments, and an included angle of 0° to 90° is formed between two adjacent straight segments. As shown in FIG. 1, the suspended floating portion 300 includes a first straight segment 340, an arc segment 350 and a second straight segment 360 connected in sequence. An acute angle is formed between an extension direction of the first straight segment 340 and an extension direction of the second straight segment 360. When in use, the first straight segment 340 and the second straight segment 360 are bent together to form a suspended segment including the partial first straight segment 340, the entire arc segment 350 and the partial second straight segment 360. That is, in the embodiment, one arc segment and two straight segments are bent together to form one suspended segment, and an acute angle is formed between the two straight segments.

Figure 2:
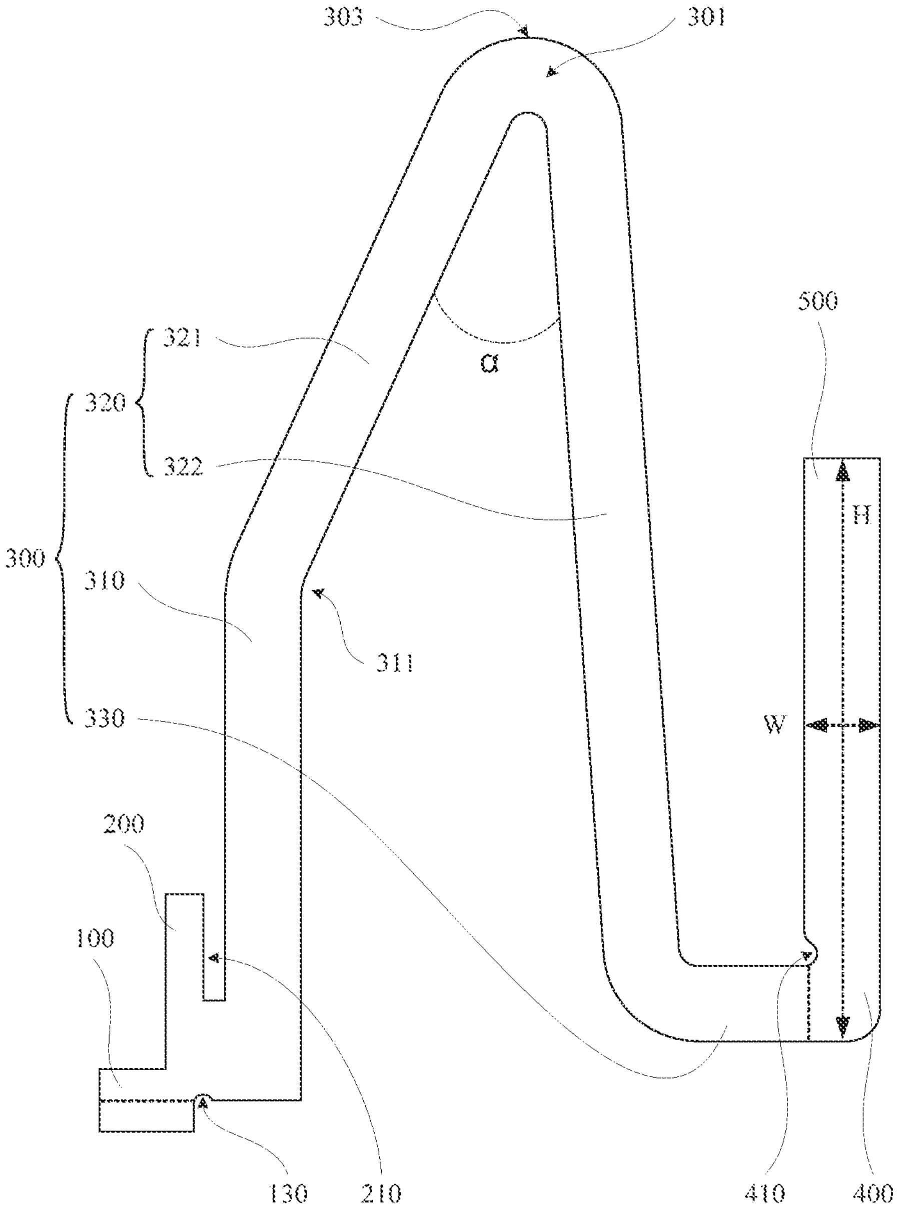
FIG. 2 is a schematic structure diagram of a floating connection conductor before being bent according to another embodiment of the present disclosure.

The suspended segment is designed to reduce the vibration energy as much as possible and avoid pulling caused by the forces applied by the two fixed ends. In an embodiment, there is at least one suspended segment. It can be appreciated that in each embodiment, on the premise of satisfying the requirement of the structure strength, the number of the suspended segments can be greater than one or even more, to increase the attenuation effect of the vibration energy, thereby improving the vibration damping effect. In an embodiment, the suspended floating portion includes a first connection segment, a floating segment and a second connection segment connected in sequence. The first connection segment is connected to the base fixing portion; the second connection segment is connected to the floating fixing portion; the floating segment itself is bent to form the suspended segment; and/or, the floating segment and the first connection segment are bent together to form the suspended segment; and/or the floating segment and the second connection segment are bent together to form the suspended segment. In an embodiment, as for the floating connection conductor as shown in FIG. 2, the suspended floating portion 300 includes a first connection segment 310, a floating segment 320 and a second connection segment 330 sequentially connected. The first connection segment 310 is connected to the base fixing portion 200. The second connection segment 330 is connected to the floating fixing portion 400. Further, the suspended floating portion 300 is provided with a bending portion 311 at a connection portion between the first connection segment 310 and the floating segment 320, to effectively control the bending position in conjunction with the bending. The floating segment 320 includes a first floating segment 321 and a second floating segment 322 which are connected. An arc-shaped edge 303 is formed at a position where the first floating segment 321 is connected to the second floating segment 322, to reduce safety risks and avoid injury to operators. The first floating segment 321 is connected to the first connection segment 310. The second floating segment 322 is connected to the second connection segment 330. A first angle α is formed between the first floating segment 321 and the second floating segment 322, and is an acute angle.

Figure 3:
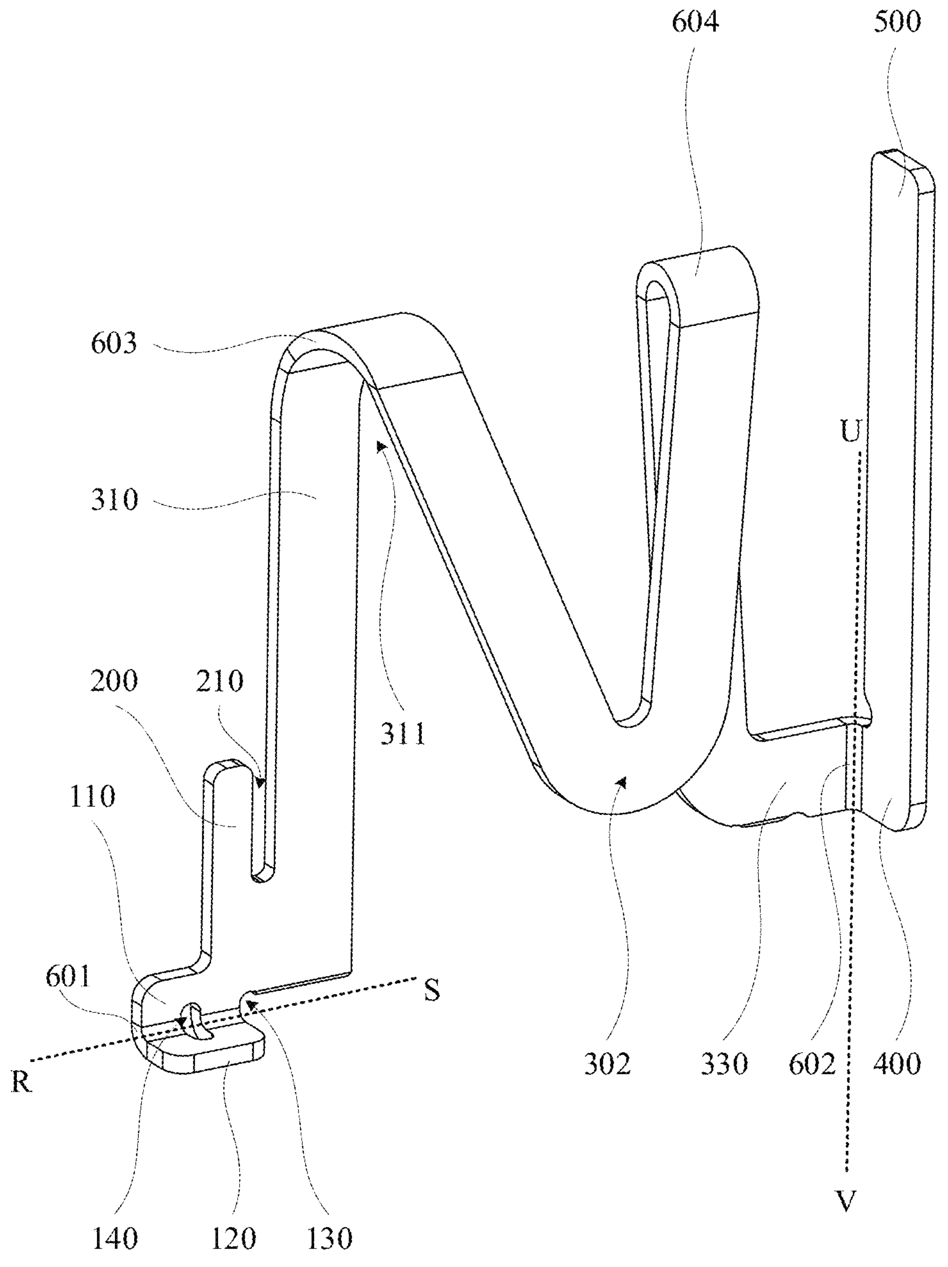
FIG. 3 is a schematic structure diagram of the floating connection conductor shown in FIG. 2 after being bent.

The suspended floating portion 300 is bent to form a suspended segment 302, as shown in FIG. 3. The weld portion 100 includes a connection region 110 and a weld region 120 connected to the connection region 110. The connection region 110 and the weld region 120 are bent. The connection region 110 is connected to the base fixing portion 200. The connection region 110 and the weld region 120 are bent to form a first bending line RS. The floating fixing portion 400 and the suspended floating portion 300 are bent to form a second bending line UV. An acute angle or an included angle of 90° is formed between the second bending line UV and the first bending line RS. The floating connection conductor is provided with a first bending opening 130 at a portion in the bending region between the connection region 110 and the weld region 120 adjacent to the suspended floating portion 300. The floating connection conductor is provided with a second bending opening 410 at a portion in the bending region between the floating fixing portion 400 and the suspended floating portion 300 adjacent to the contact portion 500.

In the embodiment, the connection region 110 and the weld region 120 are bent to form the first bending region 601. The floating fixing portion 400 and the suspended floating portion 300 are bent to form the second bending region 602. The first connection segment 310 and the first floating segment 321 are bent to form a third bending region 603. The second floating segment 322 is bent to form a fourth bending region 604. Through fitting the suspended segment 302 formed by bending, the weld portion 100 is welded with the circuit board to form a first fixed contact, and the contact portion 500 and the floating body of the socket connector and the plug connector form a second fixed contact. After the force passes through the first bending region 601, the third bending region 603, the suspended segment 302, the fourth bending region 604 and the second bending region 602 between the first fixed contact and the second fixed contact, the conduction direction of the force changes. In addition, the suspended segment can attenuate the vibration energy, so that the floating connection conductor according to the present disclosure has an effective vibration damping effect in the vibration environment. The impact of the vibration of the plug connector on the weld position between the weld portion 100 and the circuit board can be reduced to an acceptable level of safety, which is conducive to ensuring a certain service life in a certain operating environment. Therefore, the floating connection conductor according to the present disclosure is especially adapted to use in the vehicle environment.

In the embodiment, in order to avoid extrusion and leave a surplus space for solder paste, the weld portion 100 is further provided with a reserved groove 140 between the connection region 110 and the weld region 120, which is beneficial to avoid a local bulge caused by bending on one hand, and is conducive to receiving excess solder paste.

It can be seen from FIG. 2 and FIG. 3 that in the embodiment, the space occupied by the suspended segment 302 is limited by the width W of the contact portion 500, and is also limited by the total length H of the contact portion 500 and the floating fixing portion 400. That is to say, the space occupied by the floating segment 320 and the floating segment 302 of the suspended floating portion 300 is limited by the width W of the contact portion 500, and is also limited by the total length H of the contact portion 500 and the floating fixing portion 400. Through such a design, after the suspended floating portion 300 is bent, the vibration range of the suspended segment 302 does not exceed the vibration region formed by the width W of the contact portion 500, or does not exceed a region formed by the width W of the contact portion 500 and the distance between the floating connection conductors, to avoid signal transmission errors.

Figure 4:
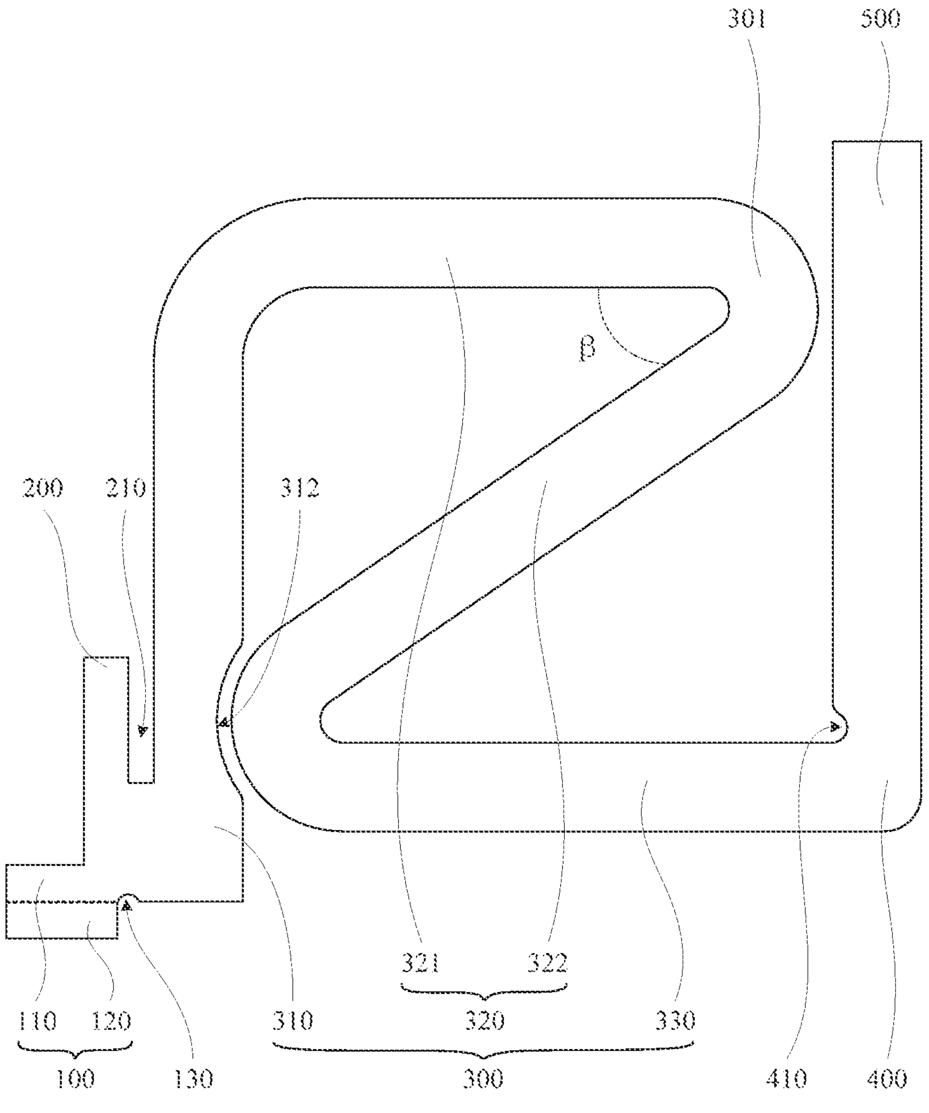
FIG. 4 is a schematic structure diagram of a floating connection conductor before being bent according to another embodiment of the present disclosure.

In an embodiment, as for the floating connection conductor as shown in FIG. 4, a second included angle β is formed between the first floating segment 321 and the second floating segment 322, and is an acute angle. Further, different from the embodiment shown in FIG. 2, the first floating segment 321 is parallel to the second connection segment 330, or the included angle between the first floating segment 321 and the second connection segment 330 is less than 5°. On the premise of satisfying the requirement of the structure strength, in order to increase the length of the suspended segment as much as possible, the first connecting section 310 is provided with an avoidance portion 312 which is configured to avoid the suspended floating portion during the stamping and blanking molding, such as the floating segment and/or the second connection segment thereof, etc., to leave a space for the suspended floating portion as much as possible, so that the suspended floating portion occupies a larger area ratio relative to a total area of the floating connection conductor to improve the anti-vibration performance. Further, a shape of the avoidance portion 312 is set according to the shape of the suspended floating portion.

Figure 5:
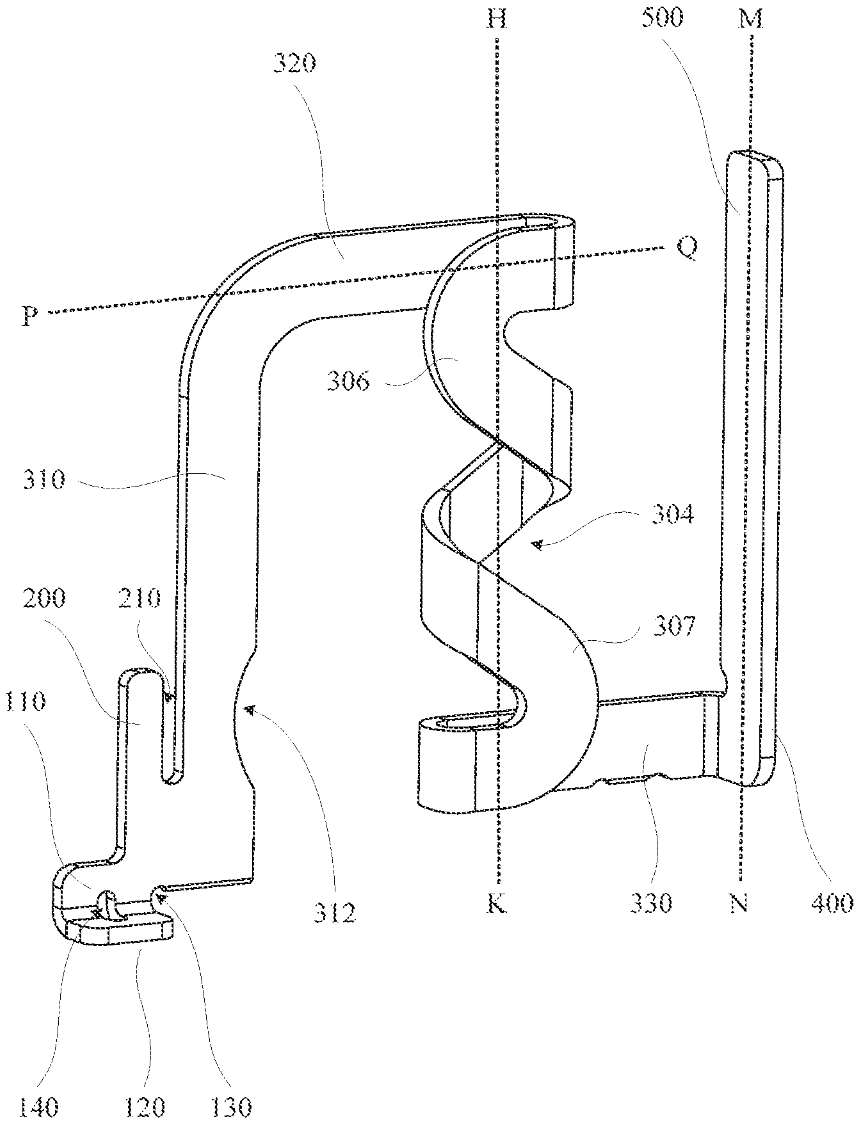
FIG. 5 is a schematic structure diagram of the floating connection conductor shown in FIG. 4 after being bent in one manner.

In an embodiment, the line along which the suspended segment is bent is perpendicular, parallel or inclined to the extension direction of the contact portion; and/or the suspended floating portion is bent sideward, bent transversely, or bent toward positive and negative sides to form the at least one suspended segment. Further, when the number of the suspended segments is greater than one, two adjacent suspended segments are spaced to avoid the mutual contact which reduces the attenuation effect of the vibration energy. In addition, such design is conducive to allowing each floating connection conductor to form multi-angle vibration damping directions in the three-dimensional space such as the space rectangular coordinate system, so that the floating connection conductor can release the vibration force on different planes. Therefore, even if the center position is offset within the preset range during board-to-board connection, since the vibration is released at multiple positions on the floating connection conductor, the connection conductor is not easy to break away from the electrical contact, so that the effective connection and conduction between the floating connection conductor and the metal conductive terminal structure can still be effectively guaranteed. Referring to FIG. 5, the suspended floating portion 300 forms two suspended segments by bidirectional side bending. That is, a part of the first floating segment 321 and the second floating segment 322 are bent together to form the first suspended segment 306, and the second floating segment 322 and a part of the second connection segment 330 to form the second suspended segment 307. A first spacing 304 is provided between the first suspended segment 306 and the second suspended segment 307.

In the embodiment, the line along which the first suspended segment 306 is bent is the same as the line along which the second suspended segment 307 is bent, that is, both are bent along the straight line HK, and the straight line HK is parallel to the extension direction MN of the contact portion 500. In the embodiment, the straight line HK is perpendicular to the extension direction PQ of the unbent portion of the first floating segment 321.

Figure 6:
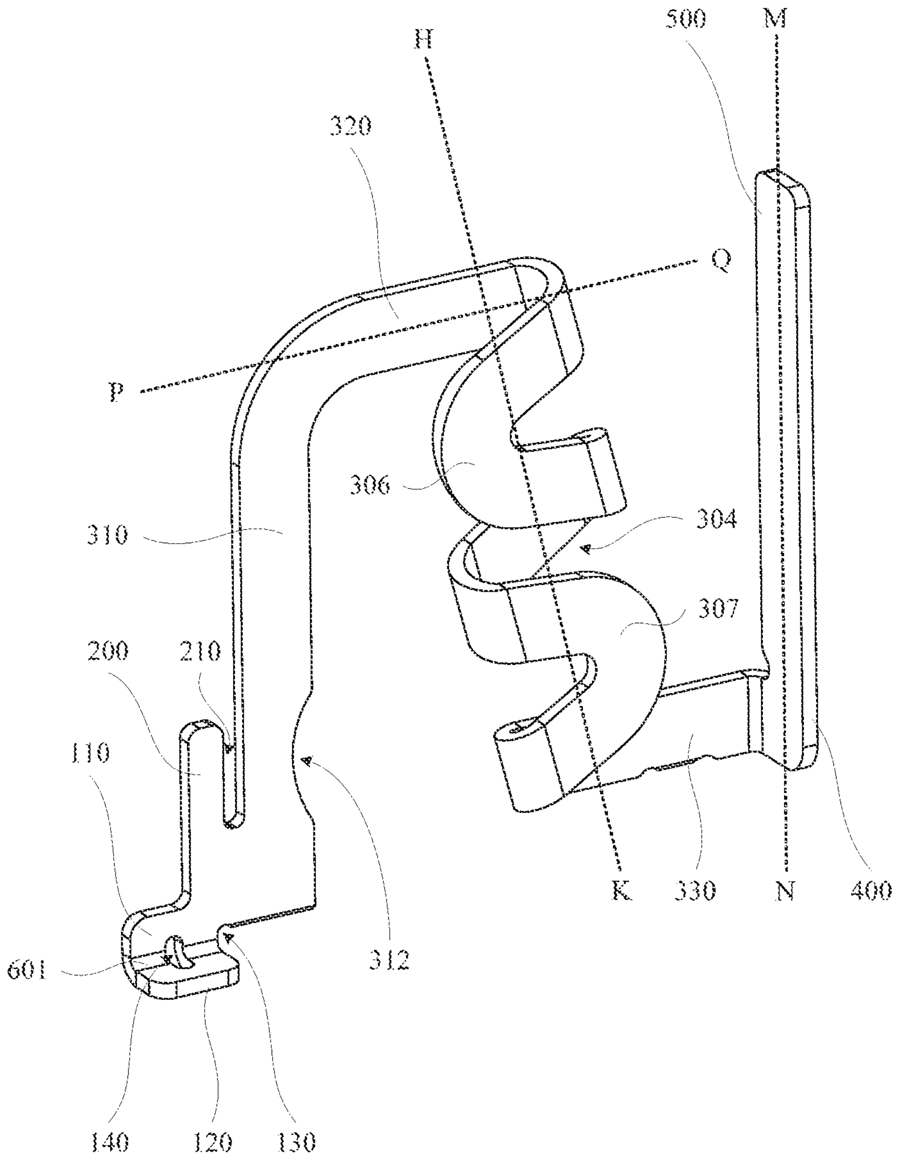
FIG. 6 is a schematic structure diagram of the floating connection conductor shown in FIG. 4 after being bent in another manner.

Referring to FIG. 6, the difference from the embodiment shown in FIG. 5 is that the line along which the first suspended segment 306 is bent and the line along which the second suspended segment 307 is bent, that is, the straight line HK, is inclined to the extension direction MN of the contact portion 500. In other embodiments, the suspended floating portion forms two suspended segments by the positive-negative bidirectional bending, that is, the first suspended segment 306 and the second suspended segment 307 are respectively located on either side of a plane formed by the straight line HK shown in FIG. 6 and the extension direction PQ of the unbent portion of the first floating segment 321.

Figure 7:
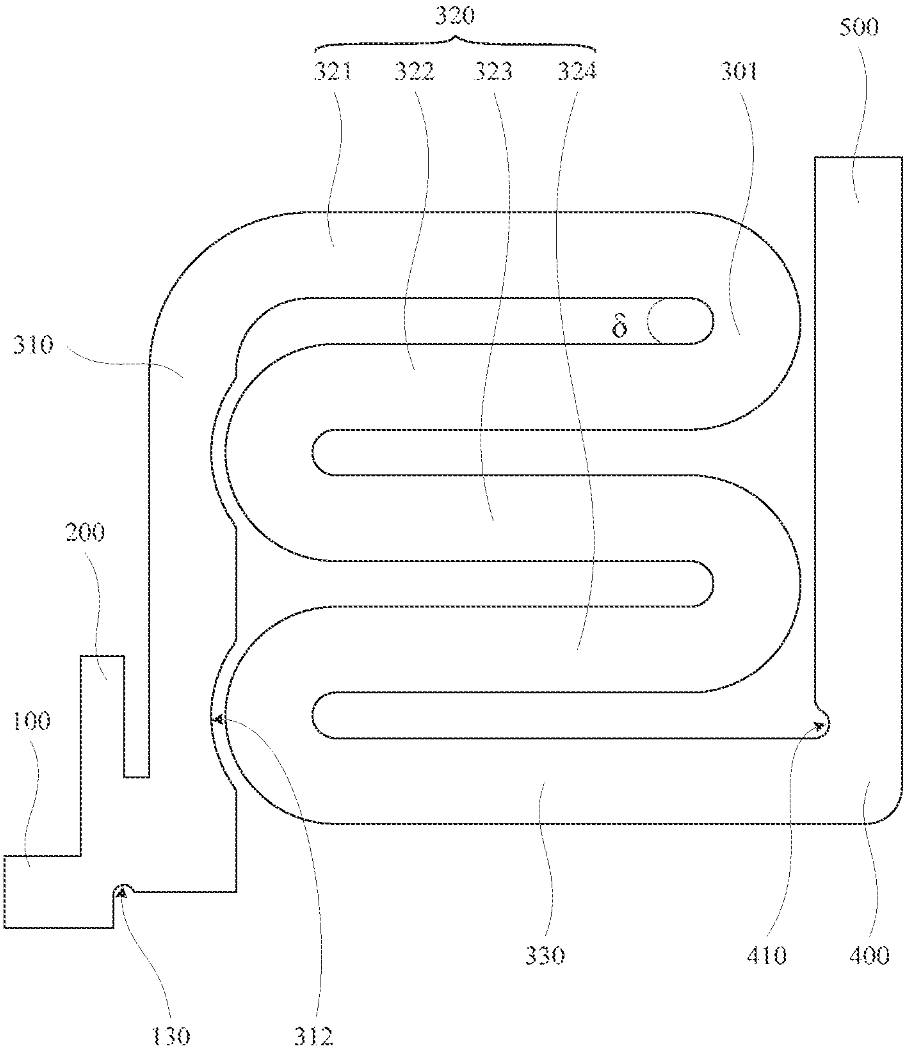
FIG. 7 is a schematic structure diagram of a floating connection conductor before being bent according to another embodiment of the present disclosure.

In an embodiment, the floating connection conductor shown in FIG. 7 is different from the embodiment shown in FIG. 4 in that the suspended floating portion 320 occupies a larger area. The suspended floating portion 320 includes a first floating segment 321, a second floating segment 322, a third floating segment 323 and a fourth floating segment 324 sequentially connected. The fourth floating segment 324 is connected to the second connection segment 330. The extension directions of the first floating segment 321, the second floating segment 322, the third floating segment 323 and the fourth floating segment 324 are parallel to each other, that is, an included angle of 0° is formed, i.e., the third included angle S formed between the first floating segment 321 and the second floating segment 322 is equal to 0°.

Figure 8:
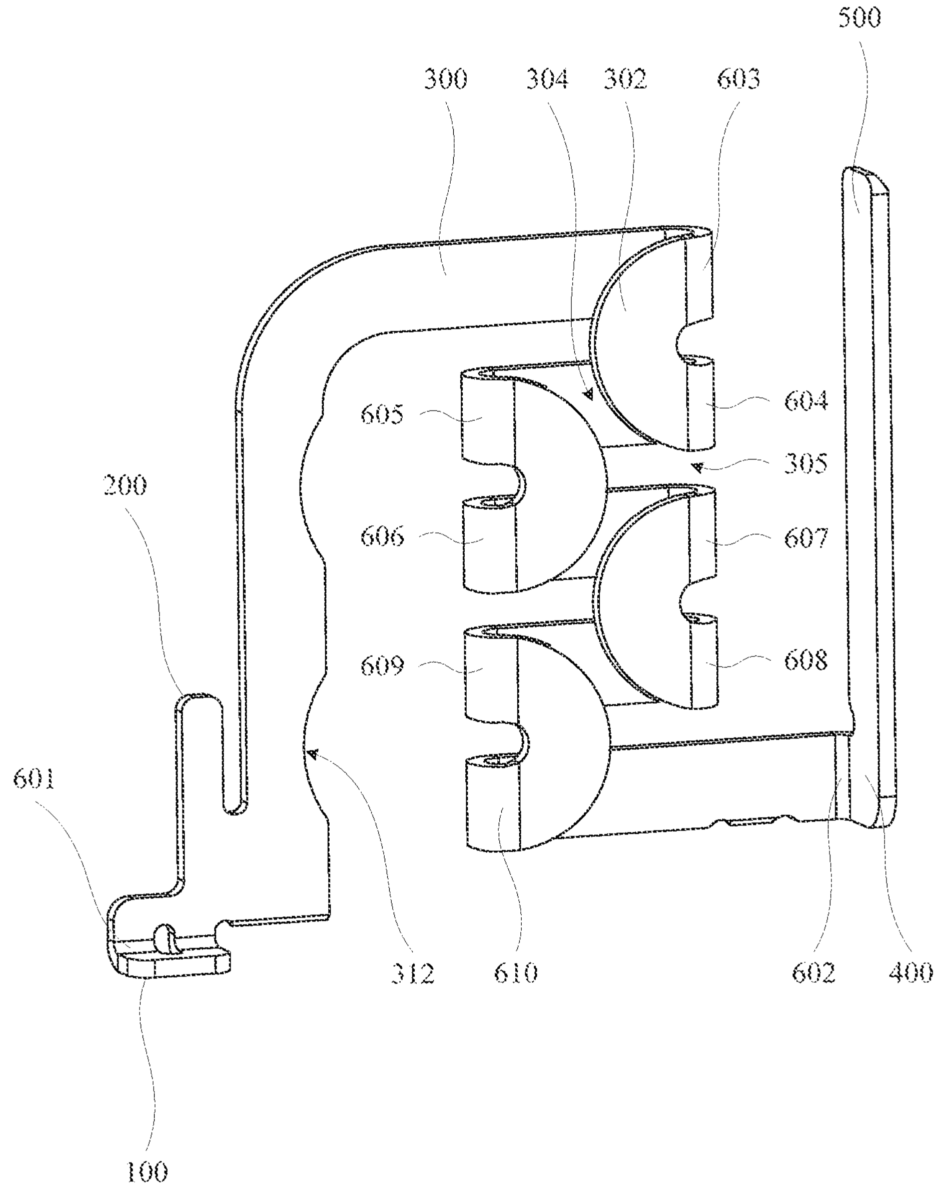
FIG. 8 is a schematic structure diagram of the floating connection conductor shown in FIG. 7 after being bent.

Referring to FIG. 8, the difference from the embodiment shown in FIG. 5 is that the floating connection conductor has four suspended segments 302, there exists a first spacing 304 between left and right adjacent suspended segments 302, and there exists a second spacing 305 between upper and lower adjacent suspended segments 302. In the embodiment, the connection region 110 and the weld region 120 are bent to form the first bending region 601. The floating fixing portion 400 and the suspended floating portion 300 are bent to form the second bending region 602. Each floating section in the floating segment 320 is bent by itself or together; or the floating segment 320 and the second connection segment 330 are bent together to form the third bending region 603, the fourth bending region 604, the fifth bending region 605, the sixth bending region 606, the seventh bending region 607, the eighth bending region 608, the ninth bending region 609, and the tenth bending region 610. Through such design, the floating connection conductor according to the present disclosure additionally blocks the transmission of vibration in each bending region, which is conducive to releasing the vibration energy, and has an effective vibration damping effect in the vibration environment; and with the self-deformability of the suspended floating portion and the suspended segments thereof, the effective connection and signal conduction between the conductor structure and the plug conductor during the board-to-board connection can be effectively guaranteed.

Figure 9:
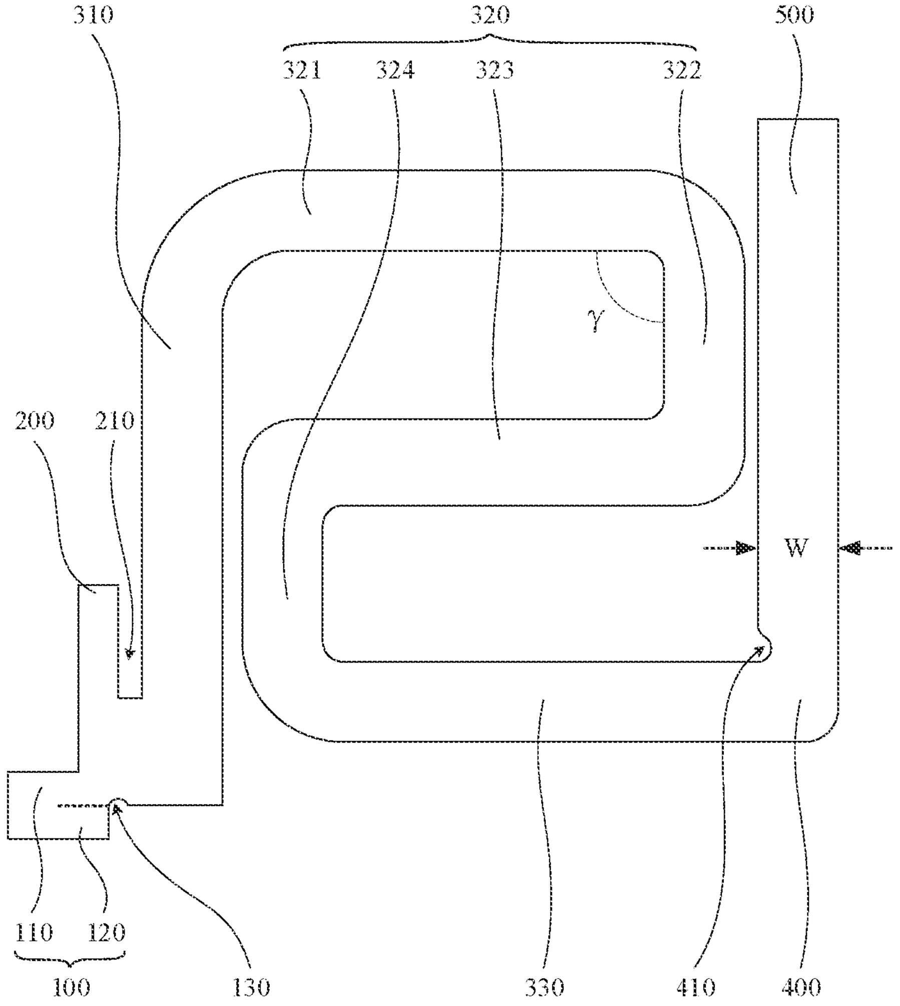
FIG. 9 is a schematic structure diagram of a floating connection conductor before being bent according to another embodiment of the present disclosure.

In an embodiment, the floating connection conductor shown in FIG. 9 is different from the embodiment shown in FIG. 7 in that the suspended floating portion 320 occupies a smaller area, but the included angles between the first floating segment 321 and the second floating segment 322, between the second floating segment 322 and the third floating segment 323, and between the third floating segment 323 and the fourth floating segment 324 are all right angles, that is, the fourth included angle $\gamma$ is a right angle. Further, in the embodiment, the floating segment 320 is respectively connected to the first connecting segment 310 and the second connection segment 330 at right angles. That is, the included angle between the first floating segment 321 and the first connection segment 310 is a right angle, and the included angle between the fourth floating segment 324 and the second connection segment 330 is a right angle. The rest of the embodiments can be deduced in the same way, and the details will not be repeated.

In an embodiment, a floating electrical connector includes a plug connector and a socket connector. The socket connector has the floating connection conductor described in any embodiment, and the socket connector further includes a base body and a floating body. That is, the socket connector includes at least two bodies, one is a fixed base body, and the other is a movable floating body. Moreover, the socket connector also has a floating connection conductor as a metal conductive connection terminal. In an embodiment, the socket connector has a floating connection conductor group consisting of at least three floating connection conductors arranged regularly. The base fixing portion of each floating connection conductor in the floating connection conductor group is fixed to the base body, the floating fixing portion is fixed to the floating body, and the contact portion is connected to and abuts against the plug connector. Through such design, the base body can be firmly installed on the floating connection conductor group without screws or glue, which is convenient for assembly on the one hand, and on the other hand can avoid the interference of screws on the rapid transmission of a large amount of signal data. Moreover, the floating body can also be firmly installed on the floating connection conductor group without screws or glue, thereby forming an overall easy-to-assemble and light-weight floating electrical connector, which is particularly adapted to the requirements of light weight and small size in the vehicle application environment.

In an embodiment, the plug connector is provided with a protruding guide post. The floating body is provided with a concave portion, or the base body and the floating body jointly form the concave portion. The shape of the protruding guide post matches the shape of the concave portion, and is configured to guide the protruding guide post to insert into the concave portion from a preset orientation. In an embodiment, the base body is provided with a heat dissipation groove, and the weld portion passes through the heat dissipation groove and is exposed outside the base body. In an embodiment, the socket connector has a floating connection conductor group consisting of at least three floating connection conductors regularly arranged. The base fixing portion of each floating connection conductor in the floating connection conductor group is fixed to the base body, the floating fixing portion is fixed to the floating body, and the contact portion is connected to and abuts against the plug connector. The plug connector is provided with a protruding guide post. The floating body is provided with a concave portion, or the base body and the floating body together form the concave portion. The shape of the protruding guide post matches the shape of the concave portion to guide the protruding guide post to insert into the concave portion from the preset orientation. The base body is provided with a heat dissipation groove; and the weld portion passes through the heat dissipation groove and is exposed outside the base body. The rest of the embodiments can be deduced in the same way, and the details will not be repeated. In such a manner, the plug connector and the socket connector are movable with each other, and essentially, the floating body and the base body are movable with each other, that is, there is a floating detachable connection. Compared to the circuit boards connected to the plug connector and the socket connector, this is a floating board-to-board connection. That is, the circuit board connected to the plug connector and the circuit board connected to the socket connector are independent of each other, and the two circuit boards are only bound by the floating connection conductor group. Accordingly the effect of the floating board-to-board electrical connection is implemented.

Further, in an embodiment, the floating body is snap-fitted and mounted on the base body through a buckle, or the floating body is snap-fitted and mounted on the base body and the circuit board through the buckles. Such design is beneficial to improve the installation stability of the floating body, but weakens the vibration damping effect to a certain extent.

Figure 10:
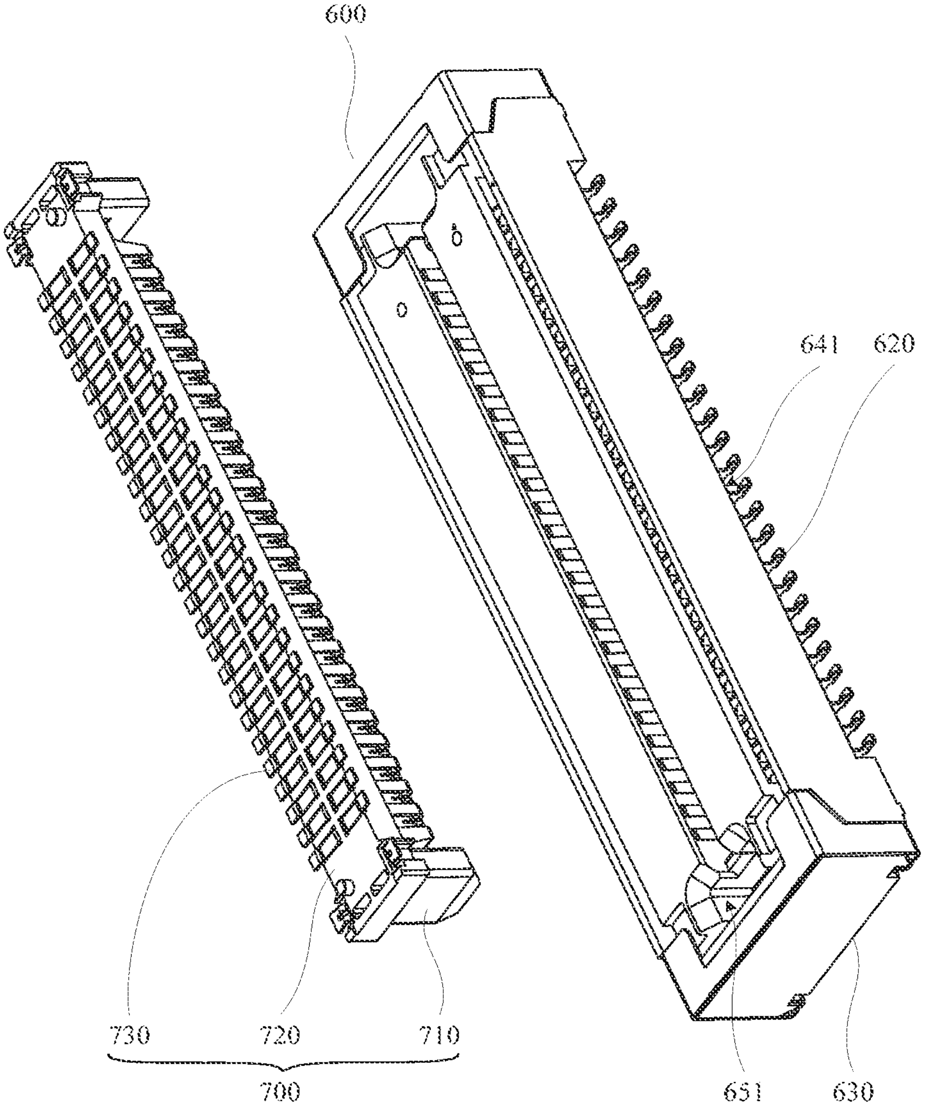
FIG. 10 is a schematic structure decomposition diagram of a floating electrical connector according to an embodiment of the present disclosure.

In an embodiment, the floating electrical connector includes a plug connector 700 and a socket connector 600 as shown in FIG. 10. The plug connector 700 is provided with a protruding guide post 710, an insulating body 720 and a metal conductive terminal group 730. In the embodiment, the protruding guide post 710 and the insulating body 720 are formed in one piece, or the protruding guide post 710 is a part of the insulating body 720. The metal conductive terminal group 730 includes at least three metal conductive terminals arranged regularly. The number of the insulating bodies 720 is greater than or equal to one.

Figure 11:
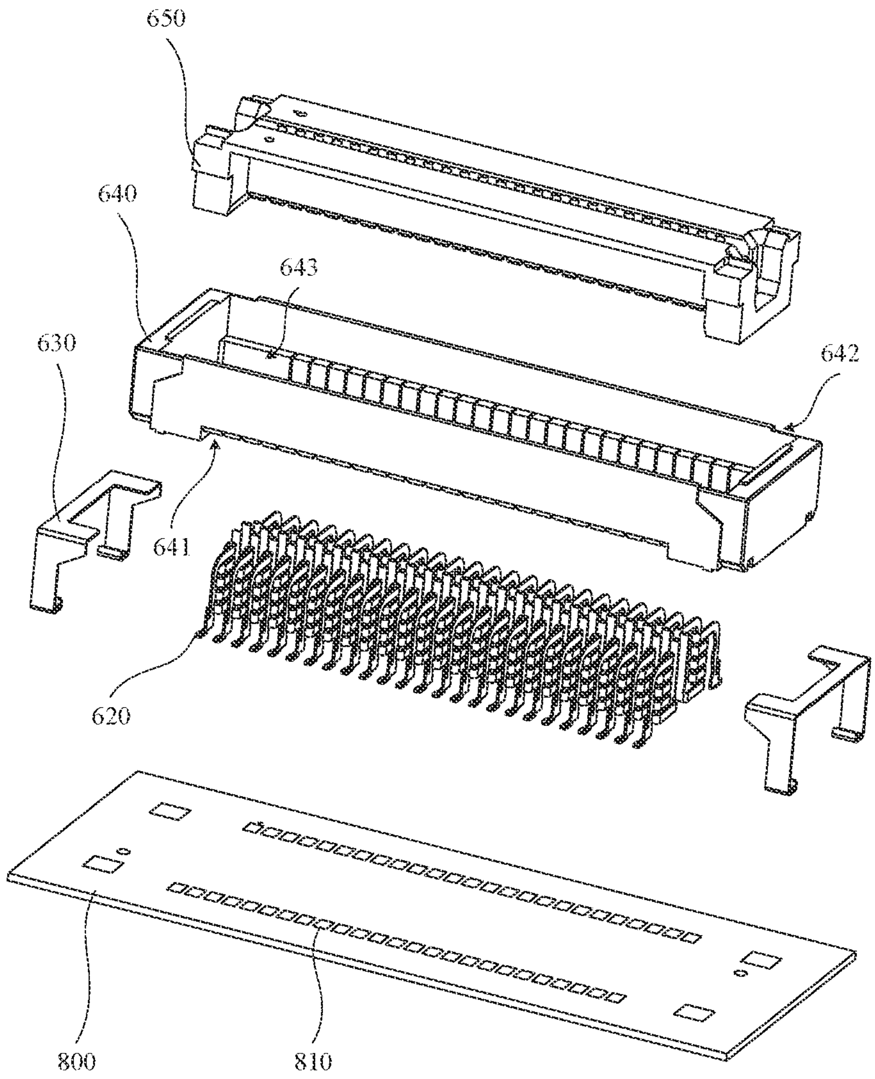
FIG. 11 is a schematic diagram illustrating a circuit board and a decomposition structure of the socket connector shown in FIG. 10.

Referring to FIG. 11, the socket connector 600 is provided with a floating connection conductor group 620, a socket weld enforcement pin 630, a base body 640 and a floating body 650. The floating connection conductor group 620 includes at least three floating connection conductors 621 arranged regularly, that is, the socket connector 600 has a floating connection conductor group 620 consisting of at least three floating connection conductors 621 arranged regularly. It can be appreciated that the connection between the plug connector and the socket connector involves multiple or even a large number of floating connection conductors, and each floating connection conductor exists in the three-dimensional environment formed when the plug connector is connected to the socket connector. Therefore, in order to improve of the floating vibration damping effect and avoid the mutual interference in the three-dimensional environment, in the embodiment, the preset width is determined according to the arrangement spacing between the floating connection conductors 621, to avoid the contact between adjacent floating connection conductors during the vibration. For each floating connection conductor 621 in the floating connection conductor group 620, the weld portion 100 thereof is welded to a pad 810 of the circuit board 800 to fix the floating connection conductor group 620 on the circuit board 800. The base fixing portion 200 is fixed to the base body 640 so that the base body 640 is fixed on the circuit board 800 through the floating connection conductor group 620. The floating fixing portion 400 is fixed to the floating body 650. The contact portion 500 is connected to and abuts against a metal conductive terminal of the plug connector 700, i.e., the electric conduction is implemented by abutting. Accordingly, on the one hand, the floating body 650 is fixed on the floating connection conductor group 620, and on the other hand, the floating connection conductor group 620 fits the floating body 650 to form an insertion type connection position, to connect the plug connector 700 through the insertion type connection manner, meanwhile the electrical connection of the floating board-to-board is implemented.

In the embodiment, the socket connector 600 is provided with two floating connection conductor groups 620. The plug connector 700 is correspondingly provided with two metal conductive terminal groups 730. In order to avoid interference between differential pairs, as shown in FIG. 11, pads 810 are arranged in misalignment. Further, the two floating connection conductor groups 620 are arranged in misalignment, and the two metal conductive terminal groups 730 are also arranged in misalignment. Further, in an embodiment, in the two floating connection conductor groups arranged in misalignment, in the extension direction of the arrangement, a misalignment distance L1 between a first floating connection conductor of one floating connection conductor group and a first floating connection conductor of the other floating connection conductor group is greater than or equal to a spacing L2 or a center distance L3 between the floating connection conductors in the same group. For example, the misalignment distance L between the first floating connection conductor of one floating connection conductor group and the first floating connection conductor of the other floating connection conductor group is equal to the center distance L3 between the floating connection conductors in the same group, that is, the first floating connection conductor of one floating connection conductor group is directly opposite to the second floating connection conductor of the other floating connection conductor group. For example, the misalignment distance L1 between the first floating connection conductor of one floating connection conductor group and the first floating connection conductor of the other floating connection conductor group is greater than or equal to the center distance L3 between the floating connection conductors in the same group, that is, in the misalignment arrangement, the misalignment distance is equal to at least one PIN pitch. The rest of the embodiments can be deduced in the same way, and the details will not be repeated. In such design, the floating connection conductor groups and the metal conductive terminals are all arranged in misalignment, which is beneficial to reduce crosstalk between the shoulder-to-shoulder differential pairs of the floating electrical connectors, and reduce the crosstalk between the face-to-face differential pairs of the floating electrical connectors, thereby ensuring that the electrical performance of the floating electrical connector under a large installation tolerance state is in a controllable state, and ensuring the high-speed transmission of large amounts of data.

Figure 12:
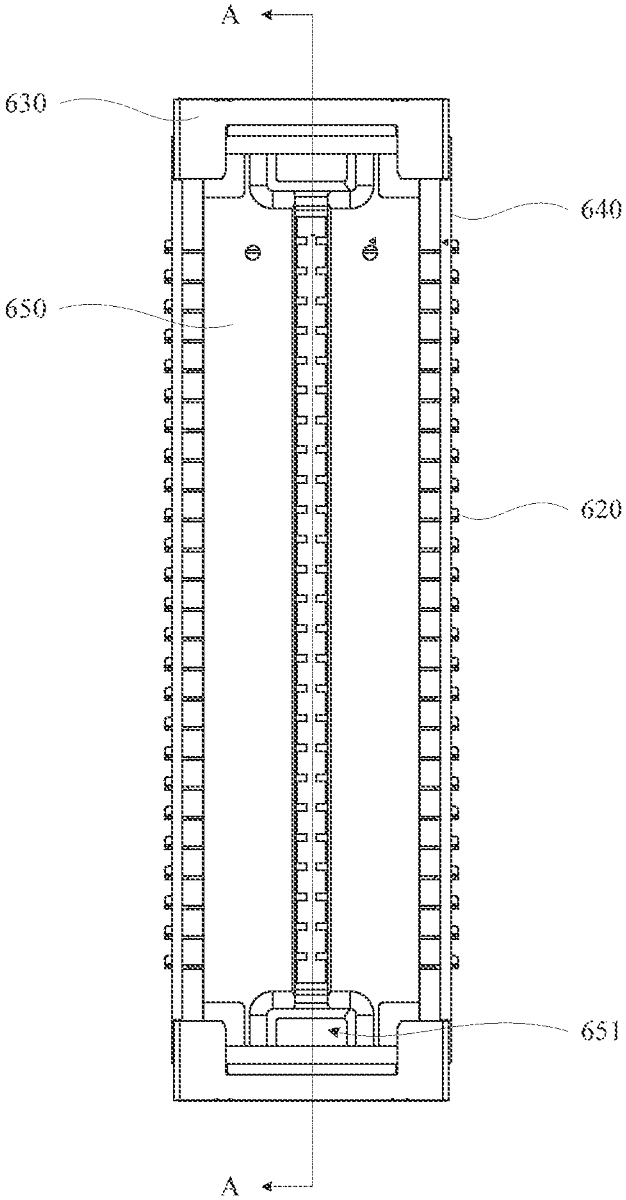
FIG. 12 is a schematic structure diagram of the socket connector shown in FIG. 10.
Figure 13:
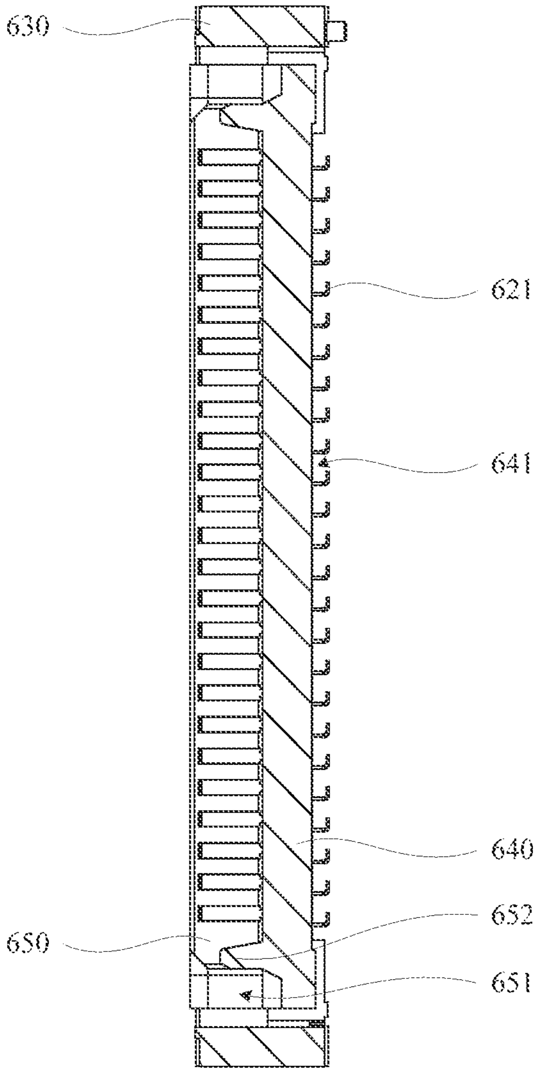
FIG. 13 is a schematic cross-sectional view taken along the A-A direction shown in FIG. 12.
Figure 14:
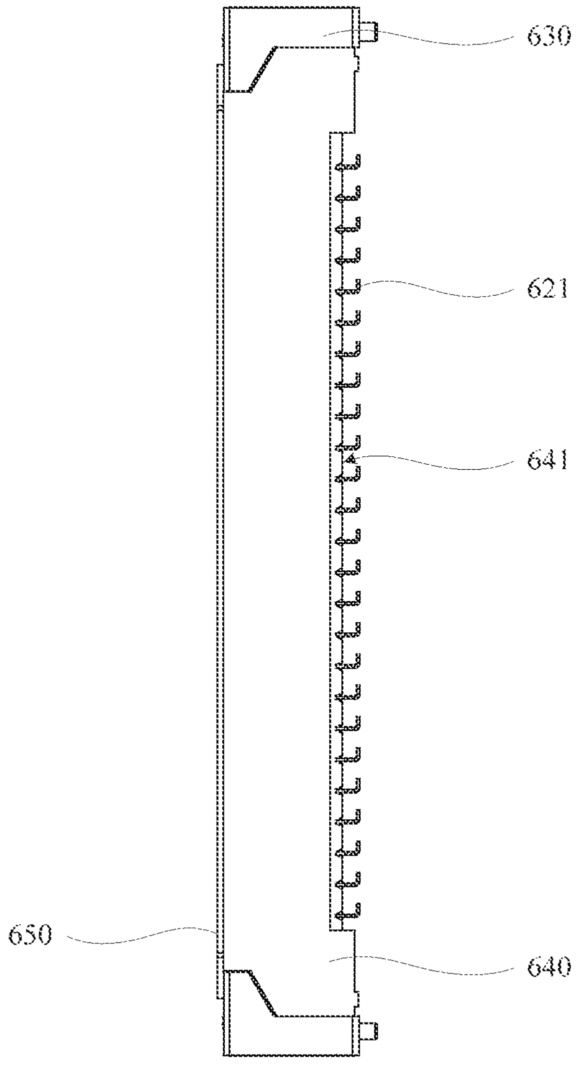
FIG. 14 is a schematic diagram of the socket connector shown in FIG. 12 in another direction.

The base body 640 of the socket connector is provided with a heat dissipation groove 641, a reinforcement leg mounting groove 642 and a mounting region 643. Referring to FIG. 12, FIG. 13 and FIG. 14, the mounting region 643 is configured to receive the floating body 650 and the floating connection conductors 621 excluding the weld portions 100. The reinforcement leg mounting groove 642 is configured to mount a socket reinforcement weld leg 630. The socket reinforcement weld leg 630 is also welded on the circuit board 800 to enhance the stability of the connection between the base body 640 and the circuit board 800. In an embodiment, the socket connector is provided with two socket reinforcement weld legs. Both ends of the base body each are provided with a socket reinforcement weld leg respectively, and the socket reinforcement weld leg is snap-fitted and fixed to the floating body. The weld portion 100 of the floating connection conductor 621 passes through the heat dissipation groove 641 and is exposed outside the base body 640. The heat dissipation groove 641 is provided in the weld region of the base body of the socket connector. The design of the heat dissipation groove 641 is conducive to improving the heat dissipation effect inside the base body 640, leaving a heat dissipation channel between the base body of the socket connector and the welded circuit board, in order to facilitate the discharge the heat generated by the floating electrical connector during the docking operation, and improve the temperature rise of the floating connectors.

Figure 15:
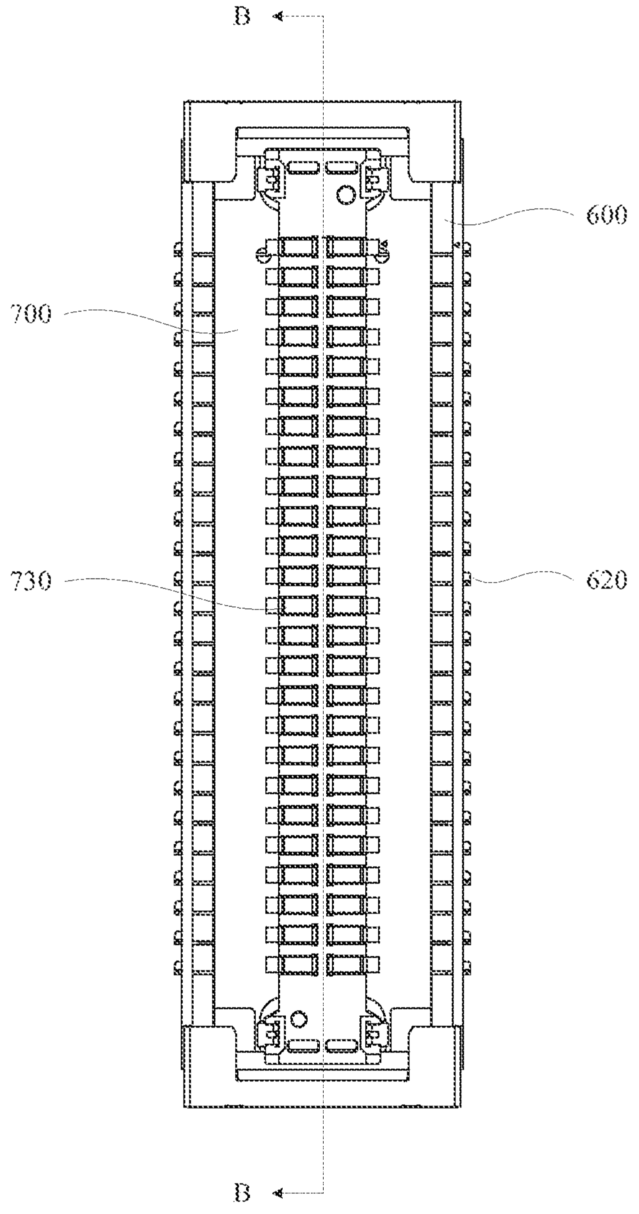
FIG. 15 is a schematic diagram of a floating electrical connector when a plug connector and a socket connector thereof are improperly connected according to another embodiment of the present disclosure.
Figure 16:
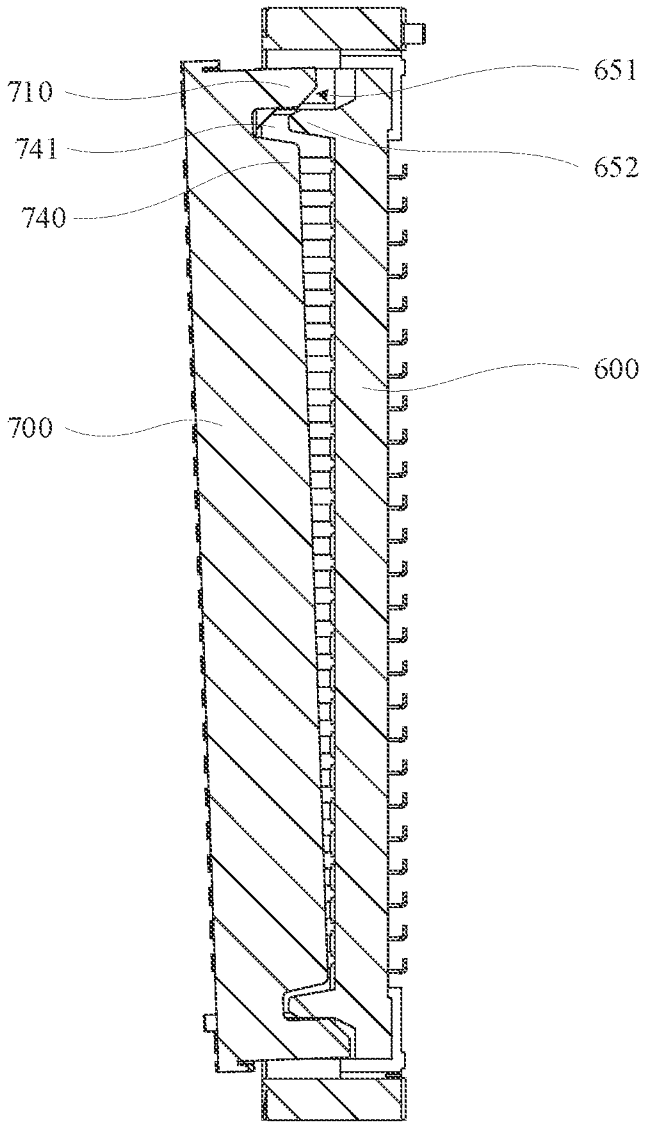
FIG. 16 is a schematic cross-sectional view taken along the B-B direction shown in FIG. 15.
Figure 17:
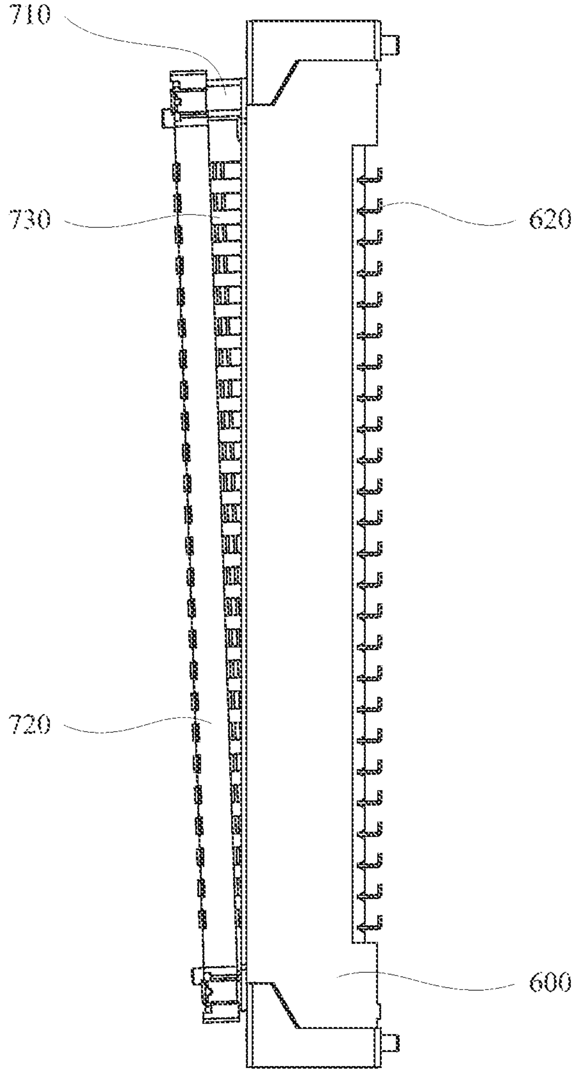
FIG. 17 is a schematic diagram of the embodiment shown in FIG. 15 in another direction.
Figure 18:
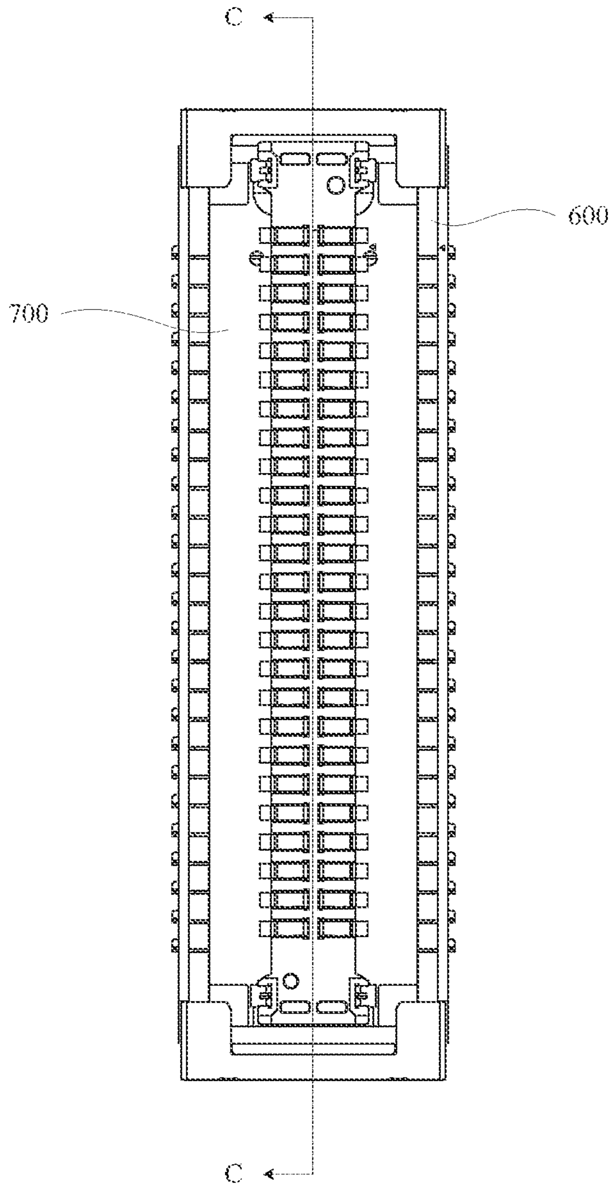
FIG. 18 is a schematic cross-sectional view in which the plug connector and socket connector shown in FIG. 15 are in a properly connected state.
Figure 19:
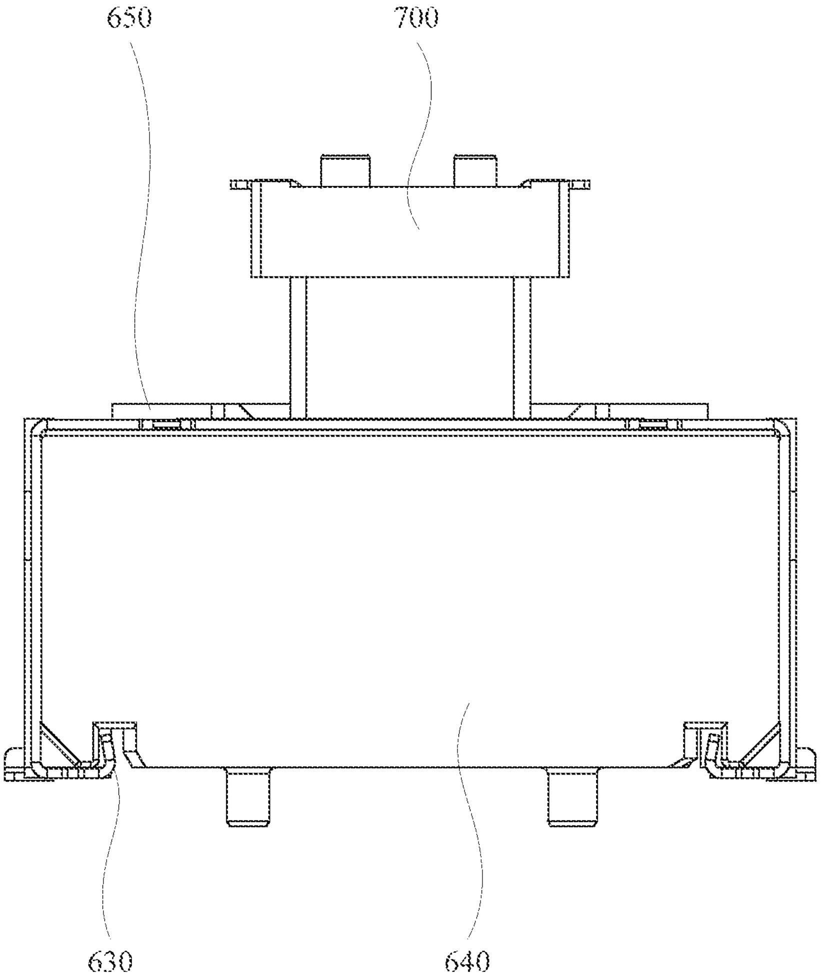
FIG. 19 is a schematic diagram of the embodiment shown in FIG. 18 in another direction.

Corresponding to the protruding guide post 710 of the plug connector 700, the floating body 650 is provided with a concave portion 651; or the base body 640 and the floating body 650 jointly form the concave portion 651. The shape of the protruding guide post 710 matches the shape of the concave portion 651, to guide the protruding guide post 710 to insert into the concave portion 651 from a preset orientation. In a practical application, referring to FIG. 15, FIG. 16 and FIG. 17, further, an end portion of the protruding guide post 710 is provided with a guide angle, and the concave portion 651 is also provided with a corresponding guide angle for mutual fitting to control the insertion direction. The height of the protruding guide post 710 is greater than that of the insulating body 720, that is, greater than a height of a tongue piece 740 of the insulating body 720. In order to avoid the misalignment during the insertion, the floating body 650 is further provided with a guide convex portion 652 adjacent to the concave portion 651. The plug connector 700 is provided with a guide groove 741 corresponding to the guide convex portion 652. The guide groove 741 is located between the protruding guide post 710 and the tongue piece 740. When the plug connector is misaligned, due to the design of the protruding guide post 710 and the concave portion 651, on the one hand, the plug connector is not easy to be stuck and difficult to pull out or cause a structural deformation or structural damage. On the other hand, it is beneficial to guide the correct plugging of the plug connector as shown in FIGS. 18 and 19. Such design, on the one hand, is beneficial to ensure the correct docking of the plug connector and the socket connector. On the other hand, when the high-speed transmission of a large amount of data is performed in the vibration environment, and even if the center position of the board-to-board connection is offset within the preset range, the speed and accuracy of the data transmission can still be guaranteed.

In an embodiment, the floating electrical connector is provided with one or two protruding guide posts at both ends of the insulating body of the plug connector. The upper end surface of the protruding guide post is higher than the end surface of the tongue piece, and the guide angle is provided on the protruding guide post. The guide groove is provided between the tongue piece and the protruding guide post. When the plug connector is plugged in the socket connector, the groove matches the structure of the guide convex portion of the socket connector to accurately locate the final plug-in position of the plug connector and the socket connector. In addition, a guide angle is further provided on the guide convex portion, and both ends of the floating body of the socket connector each are provided with a concave portion. During the plug connector is plugged in the socket connector and when the plug connector is misaligned, the guide design of the plug connector and socket connector (i.e., the guide groove and the guide convex portion, protruding guide post and the concave portion) can guide the plug connector into the correct plug-in position and prevent misalignment of the PIN or offset during the docking. When the plug connector is pulled out obliquely, the concave portions and guide convex portions at both ends of the floating body of the socket connector can be separated from the protruding guide posts and guide grooves of the plug connector without interfering with each other, thereby effectively avoiding getting stuck caused by pulling obliquely.

In an embodiment, a vehicle-mounted electronic device is provided, which includes the floating electrical connector described in any of the above-mentioned embodiments. The vehicle-mounted electronic device is applied in the field of electric vehicle electronic control integration and autonomous driving module integration. In an embodiment, the vehicle-mounted electronic device includes a navigator, a sound player, a video player, an air conditioner, a monitoring device, and the like. In an embodiment, the floating electrical connector is used in a floating board-to-board connection of the vehicle-mounted electronic device. The floating electrical connector can also be applied to electric control devices, vehicles, LED screens and industrial machines. In an embodiment, an electronic control device, such as an electronic control device having an electronic mother board and an expansion daughter board interconnected, includes the floating electrical connector described in any of the above-mentioned embodiments. In an embodiment, a vehicle, such as an electric vehicle or an autonomous vehicle, includes the floating electrical connector described in any of the above-mentioned embodiments. In an embodiment, an LED screen, such as an LED display screen with a display area of more than 4 square meters, includes the floating electrical connector described in any of the above-mentioned embodiments. In an embodiment, an industrial machine, such as an industrial robot, includes the floating electrical connector described in any of the above-mentioned embodiments.

It should be noted that other embodiments of the present disclosure further include a floating connection conductor, a floating electrical connector, and a vehicle-mounted electronic device formed by combining the technical features in the above-mentioned embodiments.

The technical features in the above-mentioned embodiments can be combined arbitrarily. In order to make the description concise, all possible combinations of the technical features in the above-mentioned embodiments are not described. However, as long as there is no contradiction in the combinations of these technical features, these combinations should be considered as within the scope of the present disclosure.

The above-mentioned embodiments are merely some embodiments of the present disclosure, and the description thereof is relatively specific and detailed, but should not be construed as limiting the scope of the patent disclosure. It should be noted that those skilled in the art can make several modifications and improvements without departing from the concept of the present disclosure, and these all fall within the protection scope of the present disclosure. Therefore, the scope of protection of the present disclosure should be subject to the appended claims.

What is claimed is:

1. A floating connection conductor, comprising a weld portion, a base fixing portion, a suspended floating portion, a floating fixing portion and a contact portion sequentially connected, wherein:

the weld portion is configured to be welded to a circuit board;

the base fixing portion is configured to be fixed to a base body;

the floating fixing portion is configured to be fixed to a floating body;

the contact portion is configured to be connected to and abut against a plug connector; and the suspended floating portion is located between the base fixing portion and the floating fixing portion and is configured to bend to form a suspended segment, a space occupied by the suspended segment is limited by a preset width;

wherein the weld portion comprises a connection region and a weld region connected to the connection region, the connection region and the weld region are bent, and the connection region is connected to the base fixing portion; and/or the floating fixing portion and the suspended floating portion are bent; and/or the base fixing portion is configured to be fixed to the base body through an insertion type connection or interference fit; and/or the contact portion is configured to be inserted into the plug connector in a pluggable manner, and be connected to and abut against the plug connector; and/or the floating fixing portion and the contact portion are formed in one piece, or the weld portion, the base fixing portion, the suspended floating portion, the floating fixing portion, and the contact portion are formed in one piece;

wherein the floating connection conductor is provided with a first bending opening at a position in a bending region between the connection region and the weld region and adjacent to the suspended floating portion; and/or the floating connection conductor is provided with a second bending opening at a position in a bending region between the floating fixing portion and the suspended floating portion and adjacent to the contact portion.

2. The floating connection conductor according to claim 1, wherein the connection region and the weld region are bent to form a first bending line, the floating fixing portion and the suspended floating portion are bent to form a second bending line, and an included angle in a range of 75° to 105° is formed between the second bending line and the first bending line.

3. The floating connection conductor according to claim 1, wherein the space occupied by the suspended segment is limited by the width of the contact portion; and/or a space occupied by a bending region of the suspended segment formed by bending the suspended floating portion is limited by the width of the contact portion.

4. The floating connection conductor according to claim 1, wherein a space occupied by a floating segment and the suspended segment of the suspended floating portion is limited by the width of the contact portion, and is limited by a total length of the contact portion and the floating fixing portion.

5. The floating connection conductor according to claim 1, wherein the suspended floating portion comprises at least one arc segment and at least one straight segment; and the at least one arc segment is bent to form the suspended segment, and/or the at least one straight segment is bent to form the suspended segment, and/or the at least one arc segment and the at least one straight segment are bent together to form the suspended segment.

6. The floating connection conductor according to claim 5, wherein an included angle of 0° to 150° is formed between the arc segment and the straight segment.

7. The floating connection conductor according to claim 5, wherein the suspended floating portion comprises at least two straight segments, and an included angle of 0° to 90° is formed between two adjacent straight segments.

8. The floating connection conductor according to claim 1, wherein there exists at least one suspended segment;

the suspended floating portion comprises a first connection segment, a floating segment and a second connection segment sequentially connected;

the first connection segment is connected to the base fixing portion, and the second connection segment is connected to the floating fixing portion; and the suspended floating portion is bent to form the suspended segment, and/or the floating segment and the first connection segment are bent together to form the suspended segment, and/or the floating segment and the second connection segment are bent together to form the suspended segment.

9. The floating connection conductor according to claim 1, wherein the floating connection conductor is formed by stamping and blanking and bending at least once.

10. The floating connection conductor according to claim 9, wherein a line along which the suspended segment is bent is perpendicular, parallel or inclined to an extension direction of the contact portion.

11. The floating connection conductor according to claim 9, wherein the suspended floating portion is bent sideward, bent transversely, or bent toward positive and negative sides to form the suspended segment.

12. The floating connection conductor according to claim 9, wherein the floating connection conductor is entirely within a rectangular or a circular shape before being bent to form the suspended segment, and an area occupied by the suspended floating portion is greater than 23% of a total area of the floating connection conductor.

13. A floating electrical connector, comprising a plug connector and a socket connector, wherein the socket connector is provided with the floating connection conductor according to claim 1, and the socket connector comprises the base body and the floating body.

14. The floating electrical connector according to claim 13, wherein the socket connector is provided with a floating connection conductor group consisting of at least three floating connection conductors arranged regularly; and the base fixing portion of each floating connection conductor in the floating connection conductor group is fixed to the base body, the floating fixing portion is fixed to the floating body, and the contact portion is connected to and abuts against the plug connector.

15. The floating electrical connector according to claim 13, wherein the plug connector is provided with a protruding guide post, the floating body is provided with a concave portion, or the base body and the floating body jointly form the concave portion, and a shape of the protruding guide post matches a shape of the concave portion, and is configured to guide the protruding guide post to insert into the concave portion from a preset orientation.

16. The floating electrical connector according to claim 15, wherein the floating body is provided with a guide convex portion adjacent to the concave portion, and the plug connector is provided with a guide groove corresponding to the guide convex portion.

17. The floating electrical connector according to claim 13, wherein the base body is provided with a heat dissipation groove, and the weld portion passes through the heat dissipation groove and is exposed outside the base body.

18. A vehicle-mounted electronic device, comprising the floating electrical connector according to claim 13.

* * * * *